US010257136B2

(12) United States Patent
Wang et al.

(10) Patent No.: US 10,257,136 B2
(45) Date of Patent: Apr. 9, 2019

(54) DATA AGGREGATION IN THE INTERNET OF THINGS

(71) Applicant: Convida Wireless, LLC, Wilmington, DE (US)

(72) Inventors: Chonggang Wang, Princeton, NJ (US); Dale N. Seed, Allentown, PA (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 33 days.

(21) Appl. No.: 14/289,106

(22) Filed: May 28, 2014

(65) Prior Publication Data

US 2014/0359035 A1    Dec. 4, 2014

Related U.S. Application Data

(60) Provisional application No. 61/827,939, filed on May 28, 2013.

(51) Int. Cl.
*G06F 15/16* (2006.01)
*H04L 29/08* (2006.01)
(Continued)

(52) U.S. Cl.
CPC .............. *H04L 51/06* (2013.01); *H04L 67/12* (2013.01); *H04L 67/125* (2013.01);
(Continued)

(58) Field of Classification Search
CPC ............................ H04L 12/58; H04L 12/5689
(Continued)

(56) References Cited

U.S. PATENT DOCUMENTS 8,514,756 B1 * 8/2013 Ramachandra ..... H04L 61/2069
370/310
8,693,374 B1 * 4/2014 Murphy .................. H04L 12/28
370/255
(Continued)

FOREIGN PATENT DOCUMENTS

EP          2 675 196      12/2013
WO       WO 2012-122864     9/2012
WO       WO 2014-193950    12/2014

OTHER PUBLICATIONS

European Telecommunications Standards Institute (ETSI), 102 690 V1.1.1, Machine-to-Machine communications (M2M); Functional architecture, Oct. 2011, 280 pages.
(Continued)

*Primary Examiner* — Ario Etienne
*Assistant Examiner* — Elizabeth Kassa
(74) *Attorney, Agent, or Firm* — BakerHostetler

(57) ABSTRACT

Data aggregation in an internet of things (IoT) system refers generally to collecting data such that the data can be processed in a useful manner. Existing approaches to data aggregation in IoT systems, such as a system including a network of sensors for example, often focus on network logical topology and data transmission scheduling and routing schemes. An IoT system can aggregate data at an application-protocol layer. For example, an IoT node in an IoT system can send a data aggregation request message that is capable of retrieving data from a plurality of different applications. In response, the IoT node may receive data that is representative of a set of nodes that are located downstream in the IoT system from the IoT node.

12 Claims, 13 Drawing Sheets

(51) Int. Cl.

| | |
|---|---|
| *H04L 12/58* | (2006.01) |
| *H04W 4/38* | (2018.01) |
| *H04W 4/08* | (2009.01) |
| *H04W 4/18* | (2009.01) |
| *H04W 4/80* | (2018.01) |
| *G11B 27/10* | (2006.01) |
| *H04L 12/64* | (2006.01) |
| *H04L 29/06* | (2006.01) |
| *H04W 4/70* | (2018.01) |

(52) U.S. Cl.
CPC ...... *H04L 67/2819* (2013.01); *H04L 67/2833* (2013.01); *H04W 4/08* (2013.01); *H04W 4/18* (2013.01); *H04W 4/38* (2018.02); *H04W 4/70* (2018.02)

(58) Field of Classification Search
USPC .......................................................... 709/206
See application file for complete search history.

(56) References Cited

U.S. PATENT DOCUMENTS

| | | | | |
|---|---|---|---|---|
| 2005/0278731 A1* | 12/2005 | Cameron | ............... | H04H 60/66 725/14 |
| 2006/0155862 A1* | 7/2006 | Kathi | ...................... | H04L 45/38 709/229 |
| 2006/0203808 A1* | 9/2006 | Zhang | ................. | H04L 12/2602 370/352 |
| 2007/0028001 A1* | 2/2007 | Phillips | ................... | G06F 8/656 709/238 |
| 2008/0104209 A1* | 5/2008 | Singhal | ................... | H04L 29/06 709/220 |
| 2009/0086663 A1* | 4/2009 | Ho | ........................ | H04W 40/32 370/328 |
| 2010/0255830 A1* | 10/2010 | Manolescu | ............ | G06K 9/624 455/418 |
| 2012/0059788 A1 | 3/2012 | Sekino | | |
| 2013/0024556 A1* | 1/2013 | Zhu | ....................... | H04L 41/042 709/223 |
| 2013/0182578 A1* | 7/2013 | Eidelman | ................ | H04L 43/08 370/241 |
| 2013/0227114 A1* | 8/2013 | Vasseur | ................. | H04L 41/044 709/224 |
| 2013/0232267 A1* | 9/2013 | Shatzkamer | ...... | H04L 29/08765 709/226 |
| 2014/0067902 A1* | 3/2014 | Wang | ..................... | H04L 67/02 709/201 |
| 2014/0172945 A1* | 6/2014 | Hershberg | .......... | H04L 67/2814 709/202 |
| 2015/0009818 A1* | 1/2015 | Xiao | ...................... | H04W 4/12 370/230.1 |
| 2015/0052021 A1* | 2/2015 | Elias | .................. | G06Q 30/0627 705/26.63 |

OTHER PUBLICATIONS

International Application No. PCT/US2014/039789: International Search Report and The Written Opinion dated Sep. 10, 2014, 11 pages.

International Application No. PCT/US2014/039789: International Preliminary Report on Patentability dated May 11, 2015, 8 pages.

Lee et al, "The Internet of Things—Concept and Problem Statement", Mar. 12, 2012, 18 pages.

Leiba, Hypertext Transfer Protocol (httpbis), charter-ietf-httpbis-07, Oct. 2, 2012, 6 pages, http://datatracker.ietf.org/wg/httpbis/charter.

Miller, R.R., "Attacking Asthma with Advanced Telehealth Monitoring", Labs Research, http://www.research.att.com/articles/featured_stories/2012_12/201212_asthma_VOC_detector.html.?fbi=undefined &fbid=5cTHO-F50HG, Dec. 17, 2012, 3 page.

Open Mobile Alliance (OMA), "DM Gateway Management Object", v1.1, Aug. 31, 2012, 4 pages.

Open Mobile Alliance (OMA), Gateway Management Object Technical Specification, v1.0, Dec. 4, 2012, 86 pages.

Rahman, A., "Group Communication for CoAP draft-ietf-core-groupcomm-08", May 27, 2013, 36 pages.

Rajagopalan, R. and Varshney, P.K., "Data-aggregation Techniques in Sensor Networks: A Survey", IEEE Communications Surveys & Tutorials, 2006, 8(4), 4th Quarter, 48-63.

Shelby et al, "The Constrained Application Protocol (CoAP)", Internet Engineering Task Force (IETF), RFC #7252, Jun. 2014, 112 pages.

Stanford-Clark, A. and Truong, H.L., "MQTT for Sensor Networks (MQTT-SN) Protocol Specification", v1.2, Nov. 14, 2013, 28 pages, http://mqtt.org.

Sundmaeker et al, "Vision and Challenges for Realising the Internet of Things", Cluster of European Research Projects on the Internet of Things(CERP-IoT), Mar. 2010, 236 pages.

* cited by examiner

DATA AGGREGATION IN THE INTERNET OF THINGS

CROSS REFERENCE TO RELATED APPLICATIONS

This application claims the benefit of U.S. Provisional Patent Application Ser. No. 61/827,939, filed May 28, 2013, the disclosure of which is hereby incorporated by reference as if set forth in its entirety herein.

BACKGROUND

An Internet of Things (IoT) refers generally to a global infrastructure that interconnects things to the internet. A thing in the IoT may refer to a uniquely identifiable physical or virtual thing that is accessible via network connectivity. Such things may be integrated into an information network through intelligent interfaces. An IoT system may refer to any system within the internet of things. IoT systems may include one or more end devices, such as sensors for example, which may be referred to as a front-end. IoT systems may include gateways to other networks, which may be referred to as a back-end. IoT systems typically perform: 1) data collection from the front-end (e.g., sensors or end devices) to the back-end (e.g., gateways or networks); 2) data storage at the back-end (e.g., networks or gateways); 3) data processing at the back-end (e.g., networks or gateways); and 4) data querying from users or applications. The overall performance of an IoT system may be impacted by how data, such as sensory data for example, is handled during data collection, data storage, data processing, and data querying.

Data aggregation in an IoT system refers generally to collecting data such that the data can be processed in a useful manner. Existing approaches to data aggregation in IoT systems, such as a system including a network of sensors for example, often focus on network logical topology and data transmission scheduling and routing schemes.

SUMMARY

Current approaches to data aggregation in IoT systems, such as sensor networks for example, lack techniques to aggregate data at an application-protocol layer or a service layer. Thus, current IoT systems may have greater transmission overhead, greater data transmission latency, and/or less energy efficiency as compared to example IoT systems described herein. Systems, methods, and apparatus embodiments are described herein for data aggregation at an application-protocol layer in an IoT system.

In accordance with an example embodiment, a system comprises a plurality of devices that include an intermediary node that communicates with at least some of the plurality of devices via a network. The intermediary node may send a data aggregation request message capable of retrieving data from a plurality of different applications. In response to the data aggregation request message, the intermediary node may receive data that is representative of a set of the plurality of devices, wherein the set is located downstream in the system from the intermediary node. For example, the data aggregation request message may include at least one of an aggregation rule, an aggregation condition, or an aggregation result requirement, the data representative of the set of the plurality of devices based on the at least one of the aggregation rule, the aggregation condition, or the aggregation result requirement. Further, the intermediary node may receive a data aggregation response message that includes the data representative of the set of the plurality of devices, and the data aggregation response message may further include an aggregation group identity. The intermediary node may determine whether there is a data aggregation request header that includes the aggregation group identity. If there is no data aggregation request header that includes the aggregation group identity, the intermediary node may forward the data aggregation request message to at least one device of the plurality of devices, wherein the at least one device is located upstream in the system from the intermediary node.

Embodiments disclosed herein further include a network node in a network of connected nodes that, when executing instructions on a processor, sends a data aggregation request message that is capable of retrieving data from a plurality of different applications. In response to the data aggregation request message, the network node may receive data that is representative of a set of nodes in the network of connected nodes, wherein the set is located downstream in the network from the network node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
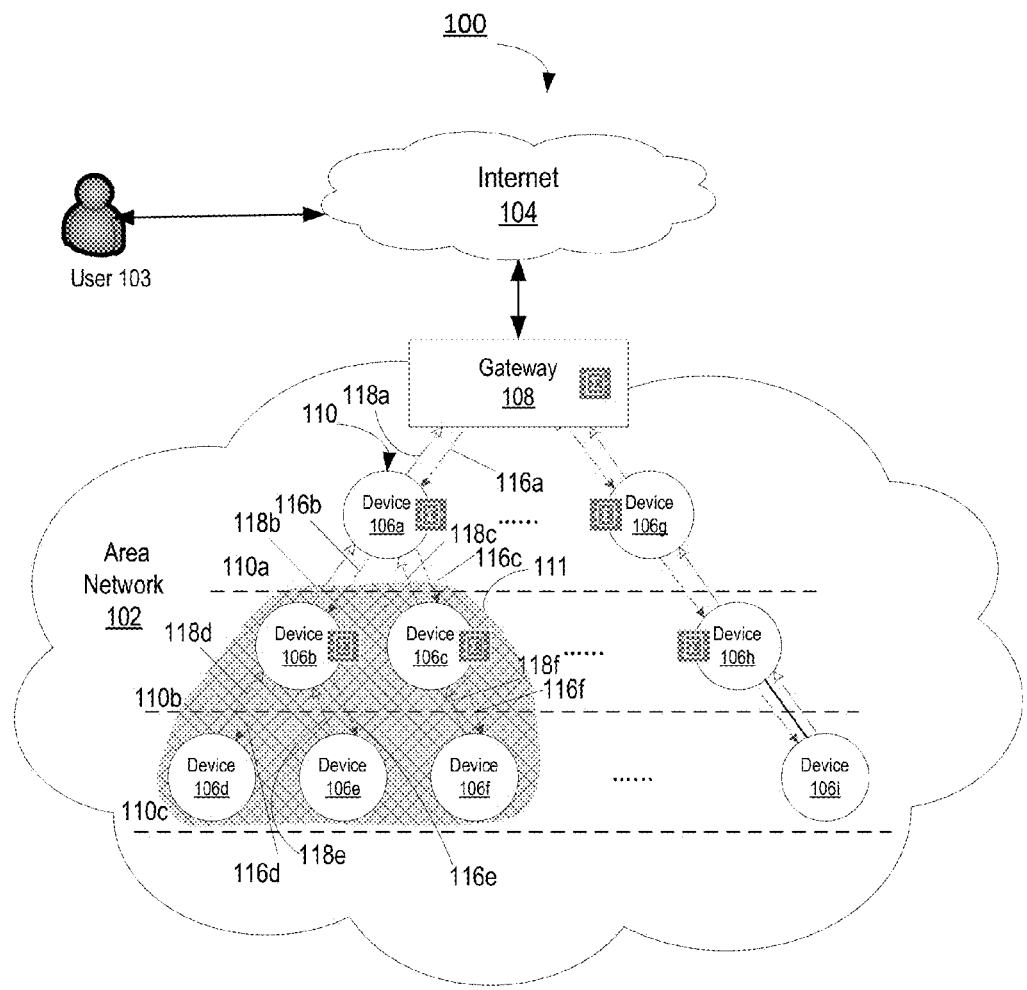
FIG. 1 is a block diagram of a system in which data aggregation can be performed in accordance with an example embodiment.

As referred to herein, an Internet of Things (IoT) refers to a global infrastructure that interconnects things to the internet. As used herein, the term IoT may refer to any network in which devices can communicate with each other, and thus the IoT may also be referred to as an IoT system or a machine-to-machine (M2M) communication system. An IoT system may consist of IoT things, IoT entities, IoT services, IoT applications, or the like. While devices, applications, services, or the like are often referred to herein as "IoT" devices, applications, services, or the like, it will be understood that the "IoT" qualifier is presented by way of example, and not presented by way of limitation. For example, an IoT thing refers to a uniquely identifiable physical or virtual thing that is accessible via network connectivity. Example IoT things include sensors, products, weather statuses, or the like. An example IoT thing that is virtual may be connected to the internet via IoT devices. By way of another example, an IoT thing may be an IoT device. Further, an IoT entity may refer to any IoT node in the network, such as an IoT device, gateway, router, server, or the like for example. An IoT application may refer to an application that is hosted on an IoT entity.

As used herein, an IoT service refers to a service that supports a modular and re-usable set of IoT capabilities, which may also be referred to as functionalities, that are made accessible via a defined IoT service interface. As used herein, application protocols generally refer to protocols for messaging between two or more communication parties, such as between two or more IoT entities for example. Example application protocols can support different IoT applications or services. Example application protocols include the constrained application protocol (CoAP), the hypertext transfer protocol (HTTP), message queue telemetry transport (MQTT), MQTT for sensors networks (MQTT-S), and the like. Example application protocol layers referred to herein, unless otherwise stated, reside above a transport layer and below a service or application layer in an example protocol stack. Example transport layers include the transmission control protocol (TCP), the user datagram protocol (UDP), or the like. Example service layers, presented by way of example and not presented by way of limitation, are the European Telecommunications Standards Institute (ETSI) machine-to-machine (M2M) service layer and the oneM2M service layer.

As described in detail below, in accordance with various embodiments, IoT systems may include multiple types of sensors that are integrated together to produce different raw sensory data. The data that is collected by the multiple sensors may have characteristics that are based on the sensors that collected the data. By way of example, data characteristics may vary based on the type of sensor that collected the respective data. By way of another example, data characteristics may vary across an IoT system based on one or more observation requirements of the sensor that collected the respective data. As described below, example data characteristics may indicate, without limitation, size of the data, tempo correlation of the data, the spatial correlation of the data, and the application-level correlation of the data.

With respect to an example data characteristic that indicates the size of the data, in an example scenario, data that is characterized as small may represent sensory data that is small in size. As used herein, sensory data refers to any data that can be collected by a sensor, such as a temperature reading that is collected by a temperature sensor for example. Small data may be characterized as small if it is less than any size as desired, such as tens of bytes for example. In some cases, sensory data can be much larger in size as compared to other sensory data. For example, sensory data that is gathered by an internet protocol (IP) camera that has a continuous high data rate video stream may be larger than sensory data that is collected by a temperature sensor. It has been recognized herein that transmitting sensory data, such as small sensory data for example, independently from other sensor data may introduce large overhead in an IoT system. For example, overhead in an IoT system may be increased as the number of the sensors in the IoT system is increased, and it may further be increased if the sensors are continuously transmitting their readings.

Tempo correlation is an example data characteristic that refers to the extent that data generated or produced at different times are correlated with each other. Thus, data may be correlated even if the data was generated at different times. For example, sensory data that is continuously generated from the same sensor, such as a data stream or example, may have a high tempo correlation. By way of example, a temperature of a room may remain unchanged for several hours. In such a situation, the raw sensory (temperature) data that is collected in the room may be aggregated, as described herein, without losing necessary information while also reducing overhead.

Spatial correlation is an example data characteristic that refers to the extent that data that is sensed by multiple sensors within the same physical region is similar to each other or correlated to each other. In some cases, multiple sensors deployed in a physical area may each generate similar data or data that is highly correlated to each other. For example, sensory data from the same type of sensors scattered in a physical region may have a high spatial correlation. As a result, it has been recognized herein that data with a high spatial correlation may be aggregated, as described herein, to reduce overhead and improve IoT systems.

Application-level correlation is an example data characteristic that refers to the extent that data that is sensed/ produced/leveraged by different types of applications or sensors are similar to each other or correlated to each other. For example, data that is collected by different types of sensors may be correlated to each other. By way of example, the data that is collected by a smoke sensor and the data that is collected by a temperature sensor is correlated with each other if the smoke sensor and the temperature sensor are triggered by a fire. By way of another example, data from a body sensor on an asthmatic sensor can be correlated to sensory data from a smoke sensor or a fragrance sensor. As described herein, application-level data that is correlated with other application-level data can be leveraged to improve IoT systems, such as event prediction and observation accuracy in IoT systems.

In accordance with an example embodiment, as described further below, an IoT system can perform different types of data observations. Example types of data observations include, presented by way of example and not presented by way of limitation, event-based data observation, query-based data observation, continuous data observation, and hybrid data observation. In an example event-based data observation scenario, an IoT system may detect an event or generate an automatic notification related to an event that is occurring. For example, the automatic notification may characterize the importance of the event as low (e.g., a temperature reading), high (e.g., a fire), or the like. A query-based data observation refers to data that is observed or requested in response to a query, for example, from a user of an IoT system. A continuous data observation may refer to sensory data that is periodically or continuously collected or generated, such as a data stream for example. A hybrid data observation refers to any IoT system that collects data using any combination of event-based observations, query-based observations, or continuous data observations.

In an example embodiment, data aggregation may be leveraged to improve IoT data operation performance during data collection, data storage, data processing, and/or data querying. As referred to herein, data aggregation generally refers to processors, operations, or functions for redefining data such that the data can be searched, processed, analyzed, or otherwise used, for example, more efficiently. Such data redefining includes, but is limited to, combining multiple data items, concatenating multiple data items, compressing multiple data items, or a combination thereof. Thus, an example input to a data aggregation may include multiple data items, and an output of the data aggregation may be a combined, concatenated, or compressed data item. For example, data can be aggregated based on rules or criteria to achieve various objectives. Thus, data can be aggregated for different purposes as described herein. Further, data aggregation may be classified into various data aggregation types. Example data aggregation types, presented by way of example and without limitation, include intra-stream data aggregation, inter-stream data aggregation, and application-level data aggregation. Intra-stream data aggregation may refer to combining (aggregating) data items within the same data stream. For example, multiple data items that are generated from the same sensor may be aggregated with each other during an example intra-stream data aggregation. Inter-stream data aggregation may refer to combining (aggregating) data items from different data streams. For example, multiple data items that are generated from different sensors may be aggregated with each other during an example inter-stream data aggregation. Application-Level Data Aggregation, which refers to the aggregation of application-level messages (e.g., request and/or response messages at the IoT service layer), for example, instead of aggregating sensory data.

As described above, data aggregation generally refers to redefining data, and data can be aggregated based on various objectives, such as business or technical objections for example. Examples of data aggregation, presented by way of example and without limitation, include data concatenation, semantic data calculation, data enrichment, message concatenation, and message reduction. In some cases of intra-stream or inter-stream data aggregation, and in particular in some cases of data concatenation, multiple blocks of sensors data may be combined with each other to reduce overhead in an IoT system. In some cases of intra-stream or inter-stream data aggregation, and in particular in some cases of semantic data calculation, data is processed to reduce the size of the data. For example, a data may be processed to calculate an average associated with the data, a minimum value associated with the data, a maximum value associated with the data, or any other appropriate calculation as desired, to reduce the size of the data or to determine desired information from the data. In some cases of intra-stream or inter-stream data aggregation, and in particular in some cases of data enrichment, additional information is added to an original data block so that the data can be interpreted as desired. In an example of application-level data aggregation, and in particular in an example of message concatenation, messages that are sent or received by an application or service within a given IoT system may be combined with each other to reduce an overall message overhead in the given IoT system. In another example of application-level data aggregation, and in particular in an example of message reduction, one or more messages that are sent or received by an application or service within a given IoT system may be merged into other messages, removed from the IoT system, not forwarded within the IoT system, or otherwise discarded to reduce unnecessary messages within the IoT system.

As mentioned above, existing data aggregation, in particular existing data aggregation for sensor networks, often focuses on network logical topology and data transmission schedule and routing schemes. In various embodiments disclosed herein, application-protocol-layer and service-layer data aggregation are described.

Data aggregation may provide various benefits for IoT systems such as, for example, reduced data transmission overhead, reduced data transmission latency, enhanced energy-efficiency, greener data transmissions, or the like. An IoT entity, such as an intermediary node, which can refer to any node in which data is routed between two or more other nodes, can aggregate multiple sensory data and/or application-level messages from other machine-to-machine (M2M) entities, such as applications or devices. The intermediary node can aggregate data based on aggregation policies, and thus may generate new data or a new message that the intermediary node can forward to the next-hop.

It has been recognized herein that issues may result from data aggregation that is performed above the application protocol layer. For example, when data is aggregated above the application protocol layer in a protocol stack, each application may need to implement its own data aggregation functions, which may be the same and redundant. By way of further example, intermediary nodes that perform the data aggregation, may need to install different and multiple applications to support different types of application-specific data aggregation. Alternatively, in accordance with various example embodiments described herein, data aggregation is performed at the application protocol layer (e.g., CoAP), which may result in various benefits. For example, data aggregation performed at the application protocol layer may allow data aggregation to a common functionality that may be available to, and thus may be leveraged by, a plurality of different applications in a given IoT system. By way of another example, intermediary nodes may not need to support different types of application-specific data aggregation when data aggregation is performed at the application protocol layer, as described herein. Further, native and built-in support for data aggregation in application protocols, such as M2M/IoT application protocols, may reduce the complexity and overhead to support and use data aggregation across different M2M/IoT service platforms and across vertical applications.

FIG. 1 illustrates an example system 100 in which data aggregation can be performed in accordance with an example embodiment. The example system 100 includes an area network 102 that is communicatively coupled to the internet 104. Because the area network 102 may connect one or more IoT or M2M devices with each other, the area network 102 may also be referred to as an IoT area network or an M2M area network, without limitation. In accordance with the illustrated embodiment, the area network 102 includes a plurality of devices 106, such as IoT devices for example, and a gateway 108 for coupling the devices 106 to the internet 104. As shown, the gateway 108 connects the area network 102 that includes the devices 106 to the internet 104. The devices 106 may include one or more sensors, such as temperature sensors for example, and thus the area network 102 may also be referred to as a sensor network 102. By way of example, the area network 102 and the gateway may be deployed inside a shopping mall for observing temperature. Thus, for example, the network 102 may be deployed by various parties such as the property owner for example or various providers such as an IoT network provider (e.g., AT&T, Verizon, etc.) or a service provider (e.g., Google, etc.). It will be appreciated that any entity within the network 102, such as the devices 106 or the gateway 108, may be referred to generally as a network node. It will further be appreciated that the example system 100 is simplified to facilitate description of the disclosed subject matter and is not intended to limit the scope of this disclosure. Other devices, systems, and configurations may be used to implement the embodiments disclosed herein in addition to, or instead of, a system such as the system 100, and all such embodiments are contemplated as within the scope of the present disclosure.

Still referring to FIG. 1, by way of example, the devices 106 can be temperature sensors that observe temperature to detect can issues such as, for example, potential fire conditions, air-conditioner problems, or the like. The gateway 108 and the devices 106 may be manufactured from the same or different manufacturers. Middleware running on the gateway 108 and the devices 106 may be provided by the manufacturers or middleware companies. In accordance with the illustrated embodiment, one or more users, such as a user 103 for example, may issue queries to the area network 102 via the internet 104. The user 103 may issue queries to discover information related to the area network 102. In cases in which the devices 106 are temperature sensors, example queries that may be issued to the area network 102 include: (1) What's the maximum temperature?; and (2) Which of the devices 106 has measured the maximum temperature? It will be understood that the above queries are presented merely for purposes of example, and any alternative queries may be issued to the network 102 as desired. With respect to the two example queries presented above, the queries may be answered by collecting raw temperature data or readings from any or all of the devices 106 and storing the data at the gateway 108 or in a cloud. Thus, the user 103 may process and analyze the raw data. It is recognized herein that the above-described technique of answering the example queries is inefficient at least in part because temperature information is collected that is not relevant to the queries. For example, the user 103 may only be concerned with the maximum temperature that has been measured by the devices 106, and thus the user 103 does not want to review all of the data that has been measured by each of the devices 106. Thus, collecting at least some, for instance all, raw data may not be necessary and may be avoided when servicing the above example queries in accordance with various example embodiments described herein.

In accordance with the illustrated embodiment, the user 103 may issue queries to the network 102, and thus to the system 100, via a user interface. The user interface, which also may be referred to as a data aggregation interface, may further allow the user to monitor, manage, and/or configure data aggregation on a device, such as ones of the devices 106 or the gateway 108 for example. In an example embodiment, the user interface may reside in the cloud, such as within the internet 104, or on a gateway device, such as the gateway 108 that is accessible to the user 103 via the internet 104. For example, the user interface may enable a user to configure data aggregation rules for the devices 106. Similarly, the user interface may allow the user to configure aggregation conditions, as described below. The user interface may be configured to display various information related to data aggregation, such as a list of aggregators for example, as described below. The user interface may further display an identifier of a critical node, as described further below, in which generated data is associated with aggregated data.

With continuing reference to FIG. 1, in accordance with the illustrated embodiment, an efficient approach to servicing the above example queries is completed via data aggregation at each or some of the devices 106. The devices 106 that are connected between two network nodes, such as between two other devices 106, may also be referred to as intermediary nodes. The area network 102 includes a tree-based hierarchical topology 110 that is formed for connecting the devices 106 to the gateway 108. The illustrated topology 110 includes a first level 110a, a second level 110b that is downstream from the first level 110a, and a third level 110c that is downstream from the second level 110b and the first level 110a. Thus, in accordance with the illustrated example, the second level 110b is upstream from the third level 110c, and the first level 110a is upstream from the second level 110b and the third level 110c. The topology 110 may include one or more, for instance a device 106a, located at the first level 110a. The topology 110 may include one or more, for instance devices 106b and 106c, located at the second level 110b. The topology 110 may further include one or more, for instance devices 106d, 106e, and 106f, located at the third level 110c. Although the illustrated embodiment in FIG. 1 shows three levels of devices 106, it will be understood that devices can be organized into more or less levels. Further, any number of devices may be located at each level of a topology as desired. It will further be understood that other topologies may be formed between the gateway 108 and intermediary nodes 106 as desired, such as a mesh topology for example.

Figure 2:
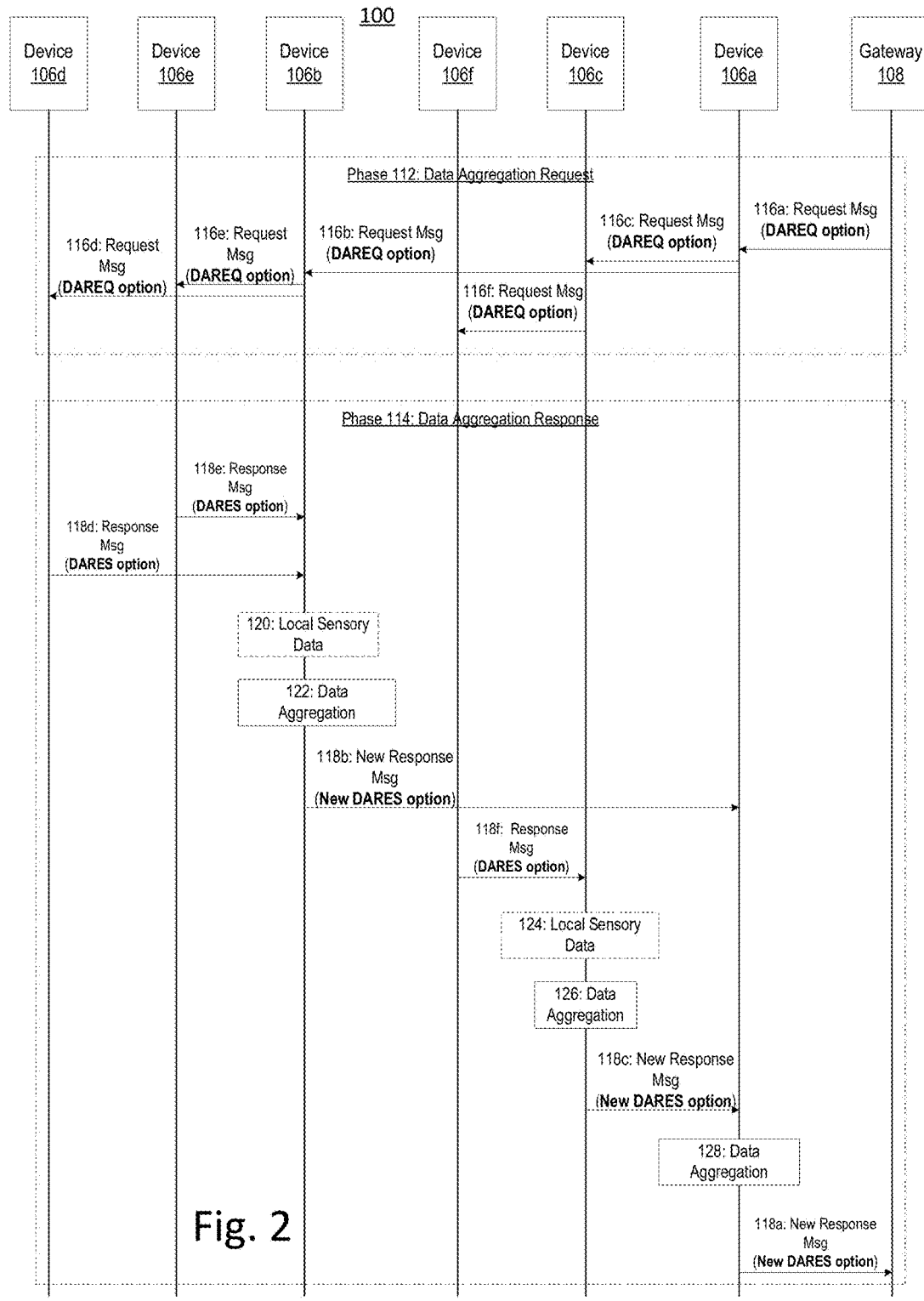
FIG. 2 is a flow diagram for application-protocol-layer data aggregation that can be performed by the system depicted in FIG. 1.

Referring also to FIG. 2, an example data aggregation may include a first phase 112 and a second phase 114. During the first phase 112, one or more data aggregation requests may be transmitted and received. As described further below, the gateway 108 may notify each device 106 in the network 102 of a forthcoming upstream data transmission and aggregation via sending the devices 106 a Data Aggregation Request (DAREQ). The gateway 108 may instruct the devices 106 how the upstream data aggregation should be performed, for example, by specifying aggregation rules and policies. For example, the gateway 108 may request that a particular device only aggregate data from a specific physical region. Referring to FIG. 1, in accordance with the illustrated example, the gateway 108 may request that the device 106a only aggregate data from a data aggregation region 111 that includes the devices 106b-f. The gateway 108 may transmit a unicast message or a multi-case message to notify the devices 106 of the data aggregation. It will be understood that the DAREQ messages may be alternatively transmitted as desired.

In accordance with an example embodiment, an application protocol header is included in one or more data aggregation requests 116, and thus the application protocol header is transmitted from the gateway 108 to one or more of the devices 106 during the first phase 112. In accordance with the illustrated embodiment, the application protocol header may be included in a data aggregation request message 116a that is sent to the device 106a, a data aggregation request message 116b that is sent to the device 106b, a data aggregation request message 116c that is sent to the device 106c, a data aggregation request message 116d that is sent to the device 106d, a data aggregation request 116e that is sent to the device 106e, and/or a data aggregation request 116f that is sent to the device 106f. Each data aggregation request message may be capable of retrieving data from a plurality of different applications. Each data aggregation request message may contain the header as a part of an application protocol header, such as CoAP header for example. Alternatively, the header can be piggybacked in existing requests, and thus separate and standalone requests may not need to be created. In an example embodiment, the gateway 108 differs from one or more intermediary nodes, such as the intermediary nodes 106a-c, because the gateway 108 may be in charge of triggering and controlling the first phase 112 of data aggregation.

Referring to FIGS. 1 and 2, the second phase 114 of an example data aggregation may include a data aggregation execution and response. In accordance with the illustrated embodiment, during the second phase 114, the devices 106 transmit data upstream toward the gateway 108. In the example network 102, an upstream direction may refer to any path toward the gateway 108, and a downstream direction may refer to any path away from gateway 108. In accordance with the example system 100 illustrated in FIG. 1, some devices 106, for instance devices 106a, 106b, 106c, 106g, and 106h, are configured as intermediary nodes and thus may also be referred to as intermediary nodes 106a, 106b, 106c, 106g, and 106h, respectively. The intermediary nodes may aggregate their local data with forwarded data that they receive from downstream nodes. The intermediary nodes may aggregate data aggregation based on rules and policies, for example, specified in one or more DAREQ messages. In accordance with an example embodiment, an application protocol header is included in one or more data aggregation responses 118 that may be sent upstream from one device to a next hop. The header may indicate how data aggregation should be done. The header may further identify the data that should be aggregated. In accordance with the illustrated embodiment, the application protocol header may be included in a data aggregation response 118a that is sent from the device 106a to the gateway 108, a data aggregation response 118b that is sent from the device 106b to the device 106a, a data aggregation response 118c that is sent from the device 106c to the device 106a, a data aggregation response 118d that is sent from the device 106d to the device 106b, a data aggregation response 118e that is sent from the device 106e to the device 106b, and/or a data aggregation response 118f that is sent from the device 106f to the device 106c. Using the data aggregation requests 116 and response 118, the number of messages that are forwarded from the intermediary nodes to the gateway 108 may be reduced. In an example embodiment, each data aggregation request message 116 may contain the header as a part of an application protocol header, such as a CoAP header for example. In an alternative embodiment, the devices 106 can actively send data aggregation requests in the upstream direction toward, for instance to, the gateway 108 to configure and initiate aggregation. In the embodiment in which the request is sent upstream, the responses may also be sent upstream by the devices 106 as shown in the illustrated second phase 114 and the system 100 depicted in FIGS. 1 and 2.

With continuing reference to FIGS. 1 and 2, each of the intermediary nodes 106a-c, 106g, and 106h may perform data aggregation such that each intermediary node functions as an application-protocol-layer proxy, which can be implemented as a CoAP forward proxy for example. In an alternative embodiment, select intermediary nodes function as an application-protocol-layer proxy and perform data aggregation, while other intermediary nodes do not participate in data aggregation. For example, some devices 106 that do not perform data aggregation may perform functions of a layer-3 router. In another alternative embodiment, data aggregation is performed at a centralized node, such as the gateway 108 for example, and the intermediary nodes do not function as an application-protocol-layer proxy.

FIG. 2 shows an example message flow for application-protocol-layer data aggregation in the example system 100 in accordance with an example. The illustrated data aggregation consists of the first phase 112 and the second phase 114. Although FIG. 2 is depicted based on the example system 100, which can also be interpreted as an example use case, that is shown in FIG. 1, it will be understood that the illustrated embodiment of FIG. 2 can be applied to other systems (use cases) that include different topologies and/or different configurations or numbers of devices.

Referring in particular to FIG. 2, during the first phase 112, the gateway 108 sends application-protocol-layer request messages (e.g., CoAP request message), which are illustrated as requests 116, to multiple targeted devices. The targeted devices may include the devices 106a-e. In particular, in accordance with the illustrated embodiment, the gateway 108 sends the request 116a to the device 106a, which sends the request 116c to the device 106c and the request 116b to the device 106b. The device 106b sends the request 116e to the device 106e and the request 116d to the device 106d. The device 106c sends the request 116f to the device 116f. In accordance with the illustrated example, the devices 106d-f are configured as end devices such that the devices 106d-f are not intermediary nodes, although it will be understood that the devices 106d-f may be alternatively configured as desired. Each of the request messages 116 may contain a data aggregation request (DAREQ) header option, for example, to inform each targeted device how the data aggregation should be performed. Thus, data aggregation request messages may be capable of retrieving data from a plurality of different devices and/or applications. Each DAREQ header may be uniquely identified by an aggregation group identity (ID) (AGID) (see FIG. 3). As mentioned above, the gateway 108 may use various manners for transmitting application-protocol-layer request messages to the targeted devices, such as unicast messages or multicast messages for example. The targeted devices 106a-f may maintain the information that is contained in the DAREQ header, and the intermediary nodes 106a-c can forward the same DAREQ to the next hop in accordance with an example embodiment. Thus, the gateway 108 may set up and may configure data aggregation at appropriate intermediary nodes during the first phase 112.

Figure 3:
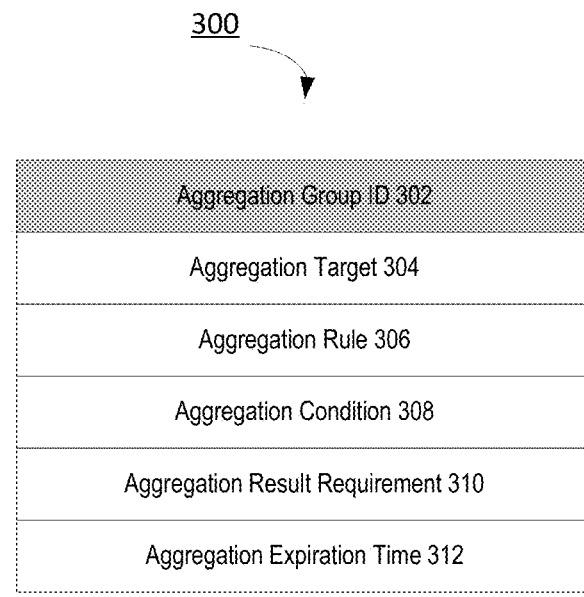
FIG. 3 shows an example data aggregation request (DAREQ) header that can be contained in an application-protocol-layer request message in accordance with an example embodiment.

Referring also to FIG. 3, an example DAREQ header 300, which may be included in one or more of the requests 116, is depicted in accordance with an example embodiment. The illustrated DAREQ header 300 is presented by way of example, and not by way of limitation. The DAREQ header 300 may include various information that is used to perform data aggregation, as described further below. For example, the DAREQ header may include an aggregation group ID (AGID) 302, an aggregation target 304, an aggregation rule 306, an aggregation condition 308, an aggregation result requirement 310, an aggregation expiration time 312, or the like. The aggregation group ID 302 may identify which data should be aggregated during the second phase 114. The aggregation target 304 may identity one or more of the devices 106 that should provide data. The aggregation rule 306 may specify how data should be calculated, and thus aggregated, during the second phase 114. The aggregation condition 308 may identify a condition that, when the condition is met, triggers data aggregation in the second phase 114. The aggregation result requirement 310, which may be part of an aggregation policy, may specify how aggregation results should be recorded and returned to the gateway 108 in the responses 118. The aggregation expiration time 312 may indicate when the respective request for aggregation expires. Thus, an example data aggregation request message may include at least one of an aggregation rule, an aggregation group identity, an aggregation condition, or an aggregation result requirement.

Figure 4:
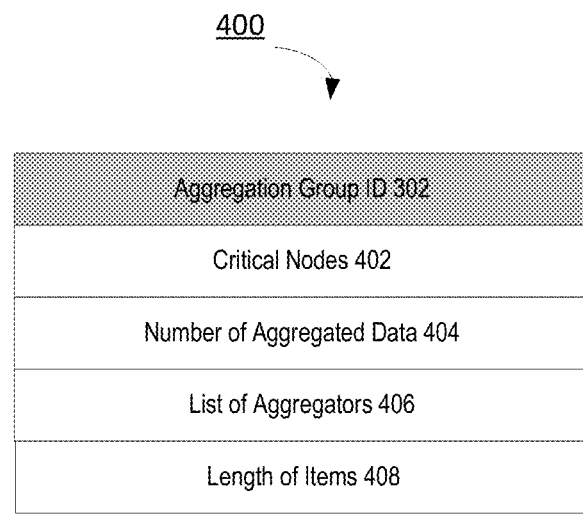
FIG. 4 shows an example data aggregation response (DARES) header that can be contained in an application-protocol-layer response message in accordance with an example embodiment.

Referring also to FIG. 4, in accordance with the illustrated embodiment, during the second phase 114, the devices 106 report data or readings back to the gateway 108 by sending the application-protocol-layer response messages 118 (e.g., CoAP response messages). For example, each of the application-protocol-layer response messages 118 may contain a data aggregation result (DARES) header, such as an example DARES header 400, to indicate information so that the next hop can conduct data aggregation as specified. FIG. 4 shows the example DARES header 400 that can be contained in an application protocol layer response message according to an example embodiment. Alternatively, DARES headers, such as the DARES header 400 for example, may be included in a request message in some scenarios. As shown and described further below, the DARES header 400 includes the aggregation group ID 302, a plurality of critical nodes 402, a number of aggregated data 404, a list of aggregators 406, and a length of items 408. In accordance with the illustrated embodiment depicted in FIG. 2, the intermediary nodes 106a-c receive a DARES header 400 in a response message, conduct data aggregation according to the information contained in the DARES header, generate a new DARES header for a new application-protocol-layer response message, and forward the new application-protocol-layer response message that includes the new DARES header to the next hop, which may be an upstream device towards the gateway 108 or the gateway 108 itself.

With particular reference to FIG. 2, the second phase 114 includes steps for aggregating data from devices 106b-f. In accordance with the illustrated example, the device 106e generates a local reading or local data and sends the application-protocol-layer response message 118e (e.g., a CoAP response message) to the device 106b. The response 118e includes a DARES header, which can also be referred to as a DARES option, such as the DARES header 400 for example. As shown, the device 106d may generate a local reading or local data and sends an application-protocol-layer response message (e.g., CoAP response message), which includes a DARES header, to the device 106b. At 120, the device 106d generates a local reading or data. For example, a local reading (data) may be generated by monitoring a temperature in a room. At 122, the device 106b aggregates the locally generated data from 120 and the data that it received in the responses 118e and 118d. The data that an intermediary node receives from a downstream device may be referred to as forwarded data. Thus, the data that the device 106b receives from the devices 106d and 106e may be referred to as forwarded data. The device 106b may aggregate the forwarded data and its local data to create an aggregated result, at 122. Based on the aggregated result, the device 106b may generate a new DARES header (option) for the response 118b, which can be referred to as a new application-protocol-layer response message (e.g., CoAP response message). The new response message 118b that includes the new DARES header is sent upstream to the device 106a.

Still referring to FIG. 2, in accordance with the illustrated embodiment, the device 106f generates a local reading or local data and sends the application-protocol-layer response message 118f (e.g., a CoAP response message) to the device 106c. The response 118f includes a DARES header, which can also be referred to as a DARES option, such as the DARES header 400 for example. At 124, the device 106c generates a local reading or data. For example, a local reading (data) may be generated by monitoring a temperature in a room. At 126, the device 106c aggregates the locally generated data from 124 and the data that it received in the responses 118b, which may be referred to as forwarded data. The device 106b may aggregate the forwarded data and its local data to create an aggregated result, at 126. Based on the aggregated result, the device 106c may generate a new DARES header (option) for the response 118c, which can be referred to as a new application-protocol-layer response message (e.g., CoAP response message). The new response message 118c that includes the new DARES header is sent upstream to the device 106a. At 128, the device 106a may aggregate the forwarded data from the devices 106b and 106c to create an aggregation result. In accordance with the example depicted in FIG. 1, the device 106a is not included in the data aggregation region 111 that was specified by the gateway 108, and thus local data generated at device 106a is not included in the example data aggregation. Based on the aggregated result from 128, the device 106a generates a new DARES header for the response 118a, which can be referred to as a new application-protocol-layer response message (e.g., CoAP response message). The response message may include the aggregation result. In some case, data, which may be representative of the downstream devices, in the new application-protocol-layer response message may be unchanged by the aggregation result. In other cases, the data in the application-protocol-layer response message is changed by the aggregation result. For example, the device 106a may, in response to its locally generated sensory data and based on an example aggregation rule, replace one of a maximum, minimum, or average value with a new maximum, minimum, or average value in the response message 118a. The response 118a is sent to the gateway 108 by the device 106a. Thus, an intermediary node, such as the device 106a for example, may send a data aggregation request message downstream that is capable of retrieving data from a plurality of different applications, and in response to the data aggregation request message, the intermediary node may receive data that is representative of a set of a plurality of devices in the system 100, wherein the set is located downstream in the system 100 from the intermediary node. Further, the data that is representative of the set of the plurality of devices may be based on at least one of the aggregation rule, the aggregation group identity, the aggregation condition, or the aggregation result requirement, which can be included in the data aggregation request message.

Referring again to FIGS. 2 and 3, the DAREQ header 300 may be contained in one of the application-protocol-layer request messages 116 (e.g., CoAP request message). The DAREQ header 300 may specify parameters such as, for example, the aggregation group ID 302, the aggregation rule 306, the aggregation condition 308, the aggregation result requirement 310, and the aggregation expiration time 312. The intermediary nodes 106a-c may store and maintain the DAREQ option 300 received from respective application-protocol-layer request messages 116. In some cases, an application-protocol-layer request message may contain multiple DAREQ headers or options.

Referring again to FIG. 4, the DARES header 400 may be contained in one application-protocol-layer response message 118 (e.g., CoAP response message). The DARES header may include fields or parameters such as, for example, the aggregation group ID 302, critical nodes 402, the number of aggregated data 404, the length of items 408, and the list of aggregators 406. In some cases, the intermediary nodes may not need to store the DARES header 400. As described with respect to FIG. 2, the intermediary nodes may generate a new DARES header and forward it to next hop after it performs data aggregation. In some cases, an application-protocol-layer response message may contain multiple DARES headers or options.

In an example embodiment, when an intermediary node receives an application-protocol-layer response message (e.g., CoAP response message), the intermediary node may use the aggregation group ID parameter 302 contained in the DARES header 400 to look up the corresponding DAREQ header 300 that may have been previously received in an application-protocol-layer request message. Thus, the intermediate node may find the aggregation rule 306 and/or other information so that it may perform data aggregation appropriately (e.g., according to the request). In an example scenario in which no DAREQ header is found, the intermediary node may forward the response message to the next hop without performing data aggregation.

Referring now to FIG. 3, the example parameters/fields that are contained in the example DAREQ header 300 are discussed in detail. In an example embodiment, the aggregation group ID (AGID) 302 is a field or parameter that may identify a group of application-protocol-layer response messages that should be aggregated. In an example scenario, only response messages that include the same AGID are aggregated with each other. For example, application-protocol-layer response messages (e.g., CoAP response message) can originate from different devices while relating to the same type of sensor readings, and thus such messages may include the same AGID 302 so that they are aggregated with each other. In accordance with another example embodiment, each DAREQ header 300 has a unique AGID 302 so that the AGID 302 may be used to uniquely identify each DAREQ header 300 contained in a request message. Intermediary nodes may store the received DAREQ header contained in an application-protocol-layer request message, and can later use the AGID 302 to locate a corresponding DAREQ header 400. The AGID 302 can be associated with a particular resource, such as one of the devices 106 (e.g., a temperature sensor or a pressure sensor) for example. By way of example, the AGID 302 can be added as an attribute for a particular resource. Thus, locally generated data or readings from the particular resource (an intermediary node) can be aggregated with application-protocol-layer response messages from other devices, for example, if the locally generated data and the received response message are associated with or include the same AGID 302.

In accordance with an example embodiment, the aggregation target field 304 may be included in the DAREQ header 300 to identify one or more devices, which may be referred to as targeted devices, that should participate in the data aggregation. The aggregation target field 304 may contain a list of target devices such as, for example, by including unique identifiers associated with each device (e.g., MAC addresses, IP addresses, URIs, or the like). In some cases, the aggregation target field 304 may indicate information associated with a location or region (e.g., the data aggregation region 111). In one example scenario, devices that are physically located within the region that is indicated in the aggregation target field 304 should participate in data aggregation. The aggregation target field 304 may be optional when transmitting the DAREQ header within some protocols, such as CoAP and HTTP for example. In some cases, aggregation target can be indicated and deduced from a URI contained within some protocols (e.g., CoAP, HTTP).

This aggregation rule (AR) field 306 may be used to define how data aggregation operations should be conducted. By way of example, the AR field 306 can also contain a link to an external data aggregation service, to which the intermediary node can forward the received request message. Thus, the data aggregation service may perform the data aggregation and return an aggregated response back to the intermediary node. Some example rules include, presented by way of example and without limitation, MIN, MAX, AVE, SUM, RANGE, CON, and AGID. An example MIN rule may instruct an intermediary node to calculate the minimum value of at least some, for instance all, data that is associated with the same AGID. For example, the intermediary node may compare response messages that it received and local data that it generated having the same AGID as the received response messages to calculate a minimum value according to the aggregation rule field 206. An example MAX rule may instruct an intermediary node to calculate the maximum value of at least some, for instance all, data that is associated with the same AGID. For example, the intermediary node may compare response messages that it received and local data that it generated having the same AGID as the received response messages to calculate a maximum value according to the aggregation rule field 206. An example AVE rule may instruct an intermediary node to calculate the average value of a payload of at least some, for instance all, response messages that it received and local data that it generated that has the same AGID as the received response messages. An example SUM rule may instruct an intermediary node to calculate the sum of a payload of at least some, for instance all, response messages that it received and local data that it generated with the same AGID as the received response messages. An example RANGE rule may instruct an intermediary node to determine or calculate a number of devices that generated raw data that falls within a given range that may be specified in the AR field 306. An example CON rule may instruct an intermediary node to combine or concatenate response messages that it received and local data that it generated having the same AGID as the received response messages. For example, at an intermediary note, the size of an aggregated result, and thus a response message, may increase as data is aggregated. In some cases, a response message that will be sent by an intermediary node may exceed a maximum transmission unit associated with a lower protocol layer (e.g., medium access control layer and/or physical layer). In an example scenario, the intermediary node may rely on a fragmentation mechanism in the lower protocol layer to enable the large message transmission. In an alternative example scenario, the intermediary node disables the aggregation before messages exceed a transmission limit. A scenario in which messages are too large may also be avoided during the first phase 114, and in particular when configuring data aggregation requests. The example calculations and processing that are presented above are presented by way of example. It will be understood that the aggregation rule field 306 may instruct nodes to perform other data aggregations as desired.

The aggregation condition field 308 may be used by an intermediary node as a qualifier to determine when data aggregation should be triggered. For example, a time value may be included in the aggregation field 308 to indicate a time duration that an incoming response message may be buffered before being aggregated. After the time duration has elapsed, the corresponding buffered response messages may be aggregated. By way of another example, buffered messages with the same Group ID can be aggregated if the buffered time exceeds a certain threshold. In another example embodiment, the aggregation condition field 308 may indicate a number of different buffered response messages that are required to trigger data aggregation. It will be understood that any combination of the above conditions may be enforced, and it will further be understood that any other appropriate conditions may be enforced as desired.

The aggregation result requirement field 310 may be included in the DAREQ header 300 to indicate how aggregation results should be generated and included in an application-protocol-layer response message (e.g., CoAP response message). For example, the aggregation result requirement field 310 may specify how the DARES 400 should be formed. In an example embodiment, aggregation result requirement field 310 indicates that the number of aggregated data field 404 should be contained in the DARES 400. In another example scenario, the aggregation result requirement field 310 indicates that the list of aggregators field 406 should be contained in the DARES 400. In yet another example scenario, the aggregation result requirement field 310 may also indicate that the critical nodes field 402 should be contained in the DARES 400. By way of example, the aggregation expiration time field 312 may be included in the DAREQ header 300 to indicate how long the DAREQ header 300 is valid and should be stored. For example, a buffered DAREQ header at an intermediary node may be removed after it expires. It will be understood that the above fields that can be included in various request messages are presented by way of example, and other field and parameters may be included in messages within the scope of the present disclosure.

Referring now to FIG. 4, the example parameters/fields that are contained in the example DARES header 400 are discussed in detail. The aggregation group ID (AGID) 302 may be included in the DARES header 400 as well as the DAREQ header 300. The critical nodes field 402 may an identifier of critical nodes. For example, a MAC address or a URI associated with the critical nodes may be included in the critical nodes field 402. The critical nodes identifier may be in various forms in accordance with various embodiments. For example, a short or long MAC address or an IPv4/IPv6 address may be included in the critical nodes field 402. The critical nodes may refer to one or more nodes where locally generated data satisfies an aggregation rule indicated in the aggregation rule field 306. By way of example, if the AR is set to a minimum value (MIN), the device in the network 102, and in particular the aggregation region 111, that generated the minimum value of data may be the critical node. By way of another example, if the AR is set to a maximum value (MAX), the device that generated the maximum value of data may be the critical node. By way of yet another example, if the AR is set to a particular range of values (RANGE), a device that generates a value of data within the particular range may be one of the critical nodes.

The number of aggregated data field 404 may indicate a number of data items that have been aggregated. In some cases, the number of aggregated data field 404 can be leveraged to perform accurate average (AVE) aggregation. The list of aggregators field 406 may include parameters that indicate one or more locations, for instance addresses, of intermediary nodes that have already performed the requested data aggregation operations. The length of items field 408 may be used by a node when the AR requires a data concatenation (CON) to indicate the length of each item in an aggregation result that includes multiple data items. It will be understood that the above fields that can be included in various response messages are presented by way of example, and other fields and parameters may be included in messages within the scope of the present disclosure. For example, the illustrated fields/parameters of the illustrated DAREQ header 300 can be included in the DARES header 400. Thus, the size of a DAREQ as compared to the illustrated DAREQ 300 may be shortened, and the size of a DARES may be extended as compared to the illustrated DARES 400, which may result in the intermediary nodes having more dynamic control on data aggregation, for example, because the intermediary nodes may be able to alter more fields in the DARES header as compared to the DAREQ header. Thus, in an example embodiment, the first phase 114 depicted in FIG. 2 may be skipped such that the intermediary nodes passively buffer and aggregate data from source devices based on the DARES. This may simplify the intermediary nodes, for example, because they do not need to maintain a data aggregation state for the DAREQ message. In another example embodiment, the aggregation condition can be moved from the DAREQ header 300 to the DARES 400 header. For example, an intermediary node can dynamically change the aggregation condition 308 for a next hop in accordance with an example embodiment.

Figure 5:
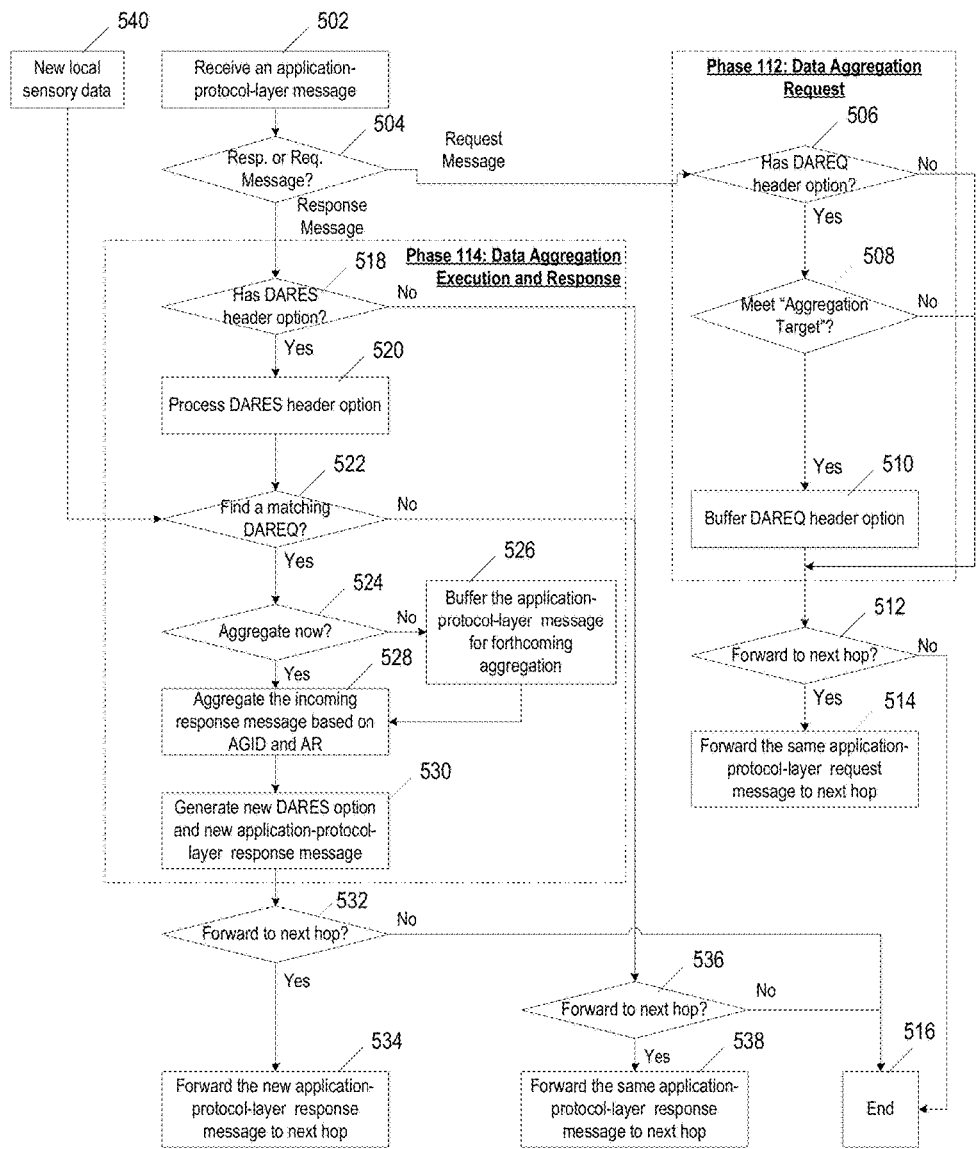
FIG. 5 shows an example process flow for data aggregation operations that can be performed by an example network node, such as one of the network nodes of the system depicted in FIG. 1.

FIG. 5 shows an example process flow for data aggregation operations that can be performed by an example node, such as one or more of the devices 106a-f in the example system 100 for example, in accordance with an example embodiment. Referring to FIG. 5, at 502, an application-protocol layer message is received by an example device, which may be an intermediary node in an IoT or M2M system. At 504, the device determines whether the received message is an aggregation request message or an aggregation response message. If the message is a request message, the process, in accordance with the illustrated embodiment, proceeds to step 506, which is part of the first phase 112. At 506, the device determines whether the DAREQ header 300 is included in the received request message. If the DAREQ header 300 is included in the message, the process proceeds to step 508, where the device checks the received message to determine whether the device is within the scope of the aggregation target 304 contained in the DAREQ header 300. If the device is one of the aggregation targets, for example, the process may proceed to step 510, where the device buffers a copy of at least a portion of the DAREQ header 300. After 510 or after the device determines that the DAREQ header 300 is not contained in the request message, the process may proceed to 512. At 512, the device determines where there is a downstream node to which the device should forward the request message. If the device is an intermediary node for example, the device may determine that there is a next hop, and the process may proceed to step 514, where the device forwards the same application-protocol-layer request message that it received downstream to the next hop, which may be another intermediary device or an end device. In an example embodiment, the request message is forwarded using CoAP proxying. If the device is an end device for example, the device, at 512, may determine that there is not another hop to which the device should forward the request message. Thus, the process may proceed to step 516, where it ends.

At 504, in accordance with the illustrated embodiment, when the device, such as an intermediary node for example, determines that the received message is an application-protocol-layer response message (e.g., CoAP response message) from another node, the process proceeds to step 518, which is part of the second phase 114. At 518, the device determines whether the DARES header 400 is included in the received response message. If the DARES header 400 is included in the message, the process proceeds to step 520, where the device processes the DARES header 400. If the DARES header 400 is not included in the received response message, the process may proceed to step 536. At 536, the device determines whether there is an upstream node to which the device should forward the response message. If the device is an intermediary node for example, the device may determine that there is a next hop, and the process may proceed to step 538, where the device forwards the same application-protocol-layer response message that it received upstream to the next hop, which may be another intermediary device or a gateway for example. If the device is an gateway device for example, the device, at 536, may determine that there is not another hop to which the device should forward the response message. Thus, the process may proceed to step 538, where it ends.

Referring still to FIG. 5, at 520, the device may process the DARES header 400 to determine, at 522, whether there is a DAREQ header that corresponds to the DARES header. For example, the device may maintain a list of DAREQ headers that the device has previously processed, and each DAREQ header may be identified by the AGID. Thus, upon receiving the DARES header that is identified by an AGID, the device may search the list of DAREQ headers to find a DAREQ header that includes the same AGID as the received DARES header. Similarly, at 540, the device may generate new local sensory data, and may proceed to step 522 to determine whether there is a DAREQ header that corresponds to the new local sensory data. For example, the device may determine whether a DAREQ header includes an AGID that corresponds to the AGID that is part of the DARES header. If no corresponding DAREQ header is found, the process may proceed to step 536, as described above. If a corresponding DAREQ header is found, the device determines whether it should aggregate its data now, at 524. In an example embodiment, the device decides whether data aggregation is performed now or later based on the aggregation condition field 308 that contained in the corresponding DAREQ header. If the device determines that the data should be aggregated later, the process may proceed to step 526, where one or more application protocol layer messages are buffered for a forthcoming aggregation, which occurs at 528. If the device determines, at 524, that the data should be aggregated now, the process may proceed to step 528, where the incoming response message is aggregated with other response messages and/or with local data generated at 540, as described herein. At 528, the data may be aggregated based on various information contained in the appropriate DAREQ header, such as the aggregation rule 306, the aggregation condition 308, or the like. Regardless of when the data is aggregated, at 530, the device may generate a new DARES header for a new application-protocol-response message. At 532, the device determines whether there is an upstream node to which the device should forward the new response message that includes the new DAREQ header. If the device is an intermediary node for example, the device may determine that there is a next hop, and the process may proceed to step 534, where the device forwards the new application-protocol-layer response message that it generated upstream to the next hop, which may be another intermediary device or a gateway for example. If the device is a gateway device for example, the device, at 532, may determine that there is not another hop to which the device should forward the response message. Thus, the process may proceed to step 516, where it ends.

Figure 6:
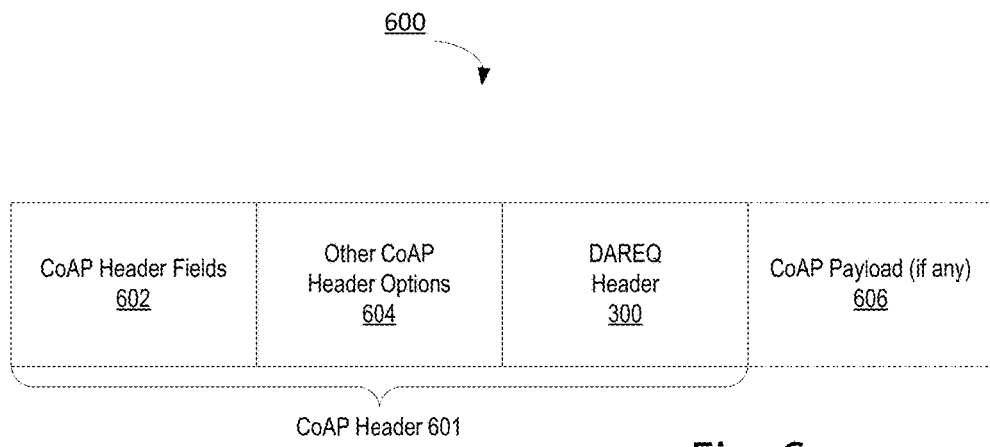
FIG. 6 illustrates a structure of a constrained application protocol (CoAP) request message in which a DAREQ header is included in accordance with an example embodiment.

The above-described application-protocol-layer messages, and thus the above-described data aggregations, can be incorporated into enhanced CoAP protocol messages in accordance with an example embodiment. For example, referring to FIG. 6, an example CoAP request message 600 includes an example CoAP header 601 that includes one or more CoAP header fields 602, one or more optional CoAP parameters 604, and the DAREQ header 300. For example, at least a portion, for instance all, of the DAREQ header 300 can be included as optional parameters in the CoAP header 601. The CoAP message 600 may further include a payload 606. As described above, the DAREQ header 300 may contain various fields/parameters such as, for example, the aggregation group ID 302, the aggregation target 304, the aggregation rule 306, the aggregation condition 308, the aggregation result requirement 310, and the aggregation expiration time 312.

Figure 7:
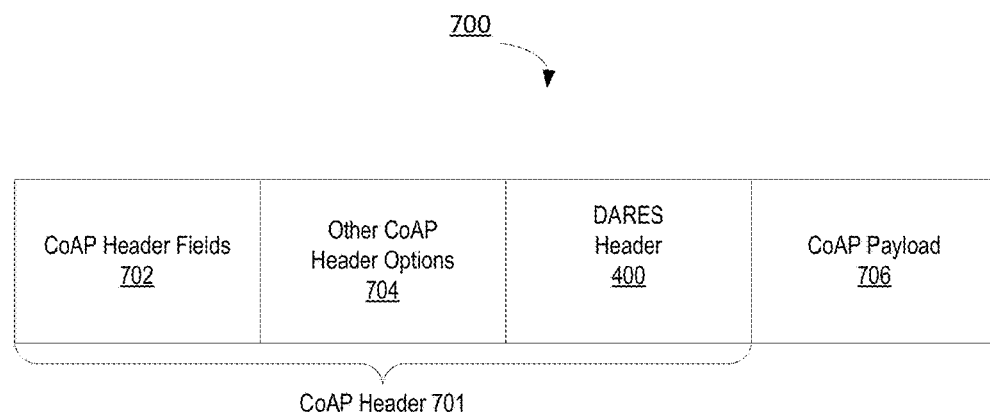
FIG. 7 illustrates a structure of a CoAP response message in which a DARES header is included in accordance with an example embodiment.

Referring to FIG. 7, in accordance with an example embodiment, an example CoAP response message 700 includes an example CoAP header 701 that includes one or more CoAP header fields 702, one or more optional CoAP parameters 704, and the DARES header 400. For example, at least a portion, for instance all, of the DAREQ header 400 can included as optional parameters in the CoAP header 701. The CoAP message 700 may further include a payload 706. As described above, the DAREQ header 300 may contain various fields/parameters such as, for example, the aggregation group ID 302, the critical nodes 402, the number of aggregated data 404, the list of aggregators 406, and the length of items 408.

Figure 8:
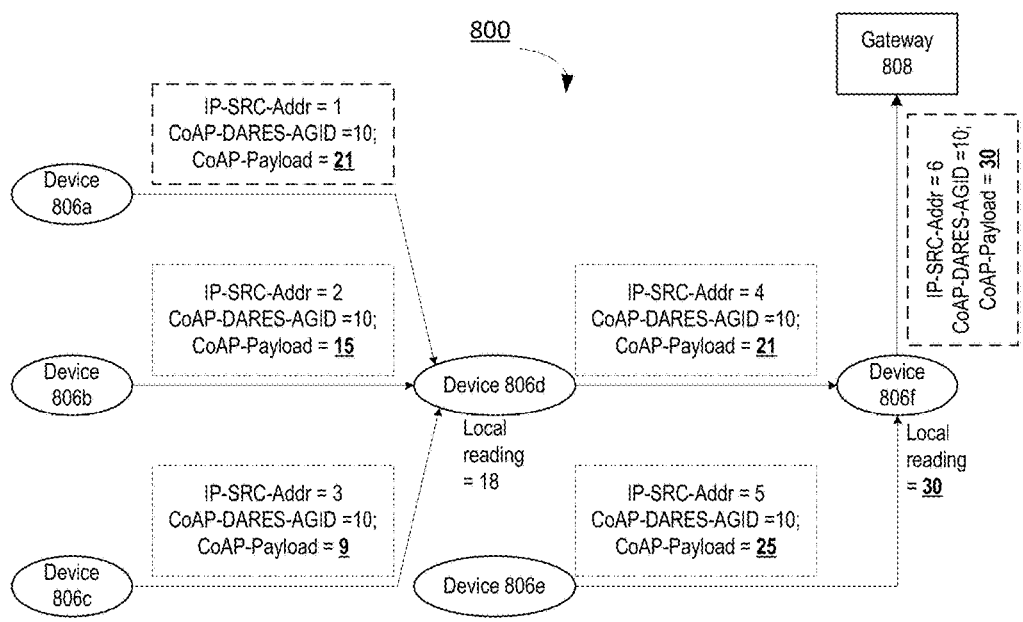
FIG. 8 shows an example of a CoAP data aggregation in accordance with an example embodiment.

FIG. 8 shows an example of a CoAP data aggregation 800 implemented in an example system 800 that is generally described with respect to FIG. 1. The system includes a gateway 808 and a plurality of devices 806 that are connected to each other in a network. The CoAP data aggregation performed in the system 800 may use the CoAP request message 600 and the CoAP response message 700. Referring to FIGS. 1 and 8, each of the devices 806a-f may comprise a temperature sensor. In accordance with the illustrated example, the devices 806a-c report their sensory data within a respective CoAP response message 700 to the intermediary device 806d. The illustrated payloads from the device 806a, 806b, and 806c are 21, 15, and 9, respectively. The illustrated AGID is 10 and the associated aggregation rule is MAX. The device 806 receives the payloads and conducts MAX aggregation on the received payloads and its local temperature reading in response to the example aggregation rule being set to MAX. Thus, the device 806d generates a new CoAP response message that includes a payload set to 21 because 21 is the maximum value in the example data aggregation. The new CoAP response includes the same AGID and the same AR that was received from the devices 806a-c. In accordance with the illustrated embodiment, the device 806f aggregates its local reading with the CoAP response messages that the device 806f received from the device 806d and the device 806e. Because the AR is set to MAX, and because the device 806f reads a reading of 30 which is greater than what it receives from the device 806d (21) and device 806e (25), the device 806f generates a new CoAP response message with a payload set to 30, and forwards it to the gateway 808. Thus, the system 800 implements data aggregation that is more efficient as compared to other implementation, such as an implementation in which each of the devices 806 forwards their data directly to the gateway 808. It will be appreciated that the example system 800 is simplified to facilitate description of the disclosed subject matter and is not intended to limit the scope of this disclosure. Other devices, systems, and configurations may be used to implement the embodiments disclosed herein in addition to, or instead of, a system such as the system 800, and all such embodiments are contemplated as within the scope of the present disclosure.

Figure 9:
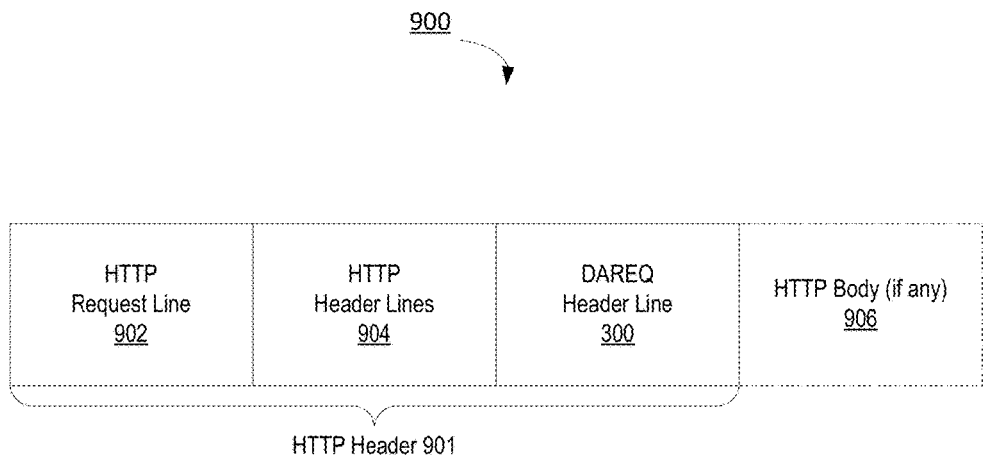
FIG. 9 illustrates a structure of a HTTP request message in which a DAREQ header is included as a header line in accordance with an example embodiment.

The above-described application-protocol-layer messages, and thus the above-described data aggregations, can be incorporated into enhanced HTTP messages in accordance with an example embodiment. For example, referring to FIG. 9, an example HTTP request message 900 includes an HTTP header 901 that includes an HTTP request line 902, HTTP header lines 904 (e.g., content-type), and the DAREQ header 300, which can be referred to as an DAREQ header line 300. For example, at least a portion, for instance all, of the DAREQ header line 300 can be included as a new HTTP header line. The DAREQ header line 300 may further include HTTP common fields as an HTTP header line. The HTTP request message 900 may further include a payload 906. As described above, the DAREQ header 300 may contain various fields/parameters such as, for example, the aggregation group ID 302, the aggregation target 304, the aggregation rule 306, the aggregation condition 308, the aggregation result requirement 310, and the aggregation expiration time 312.

Figure 10:
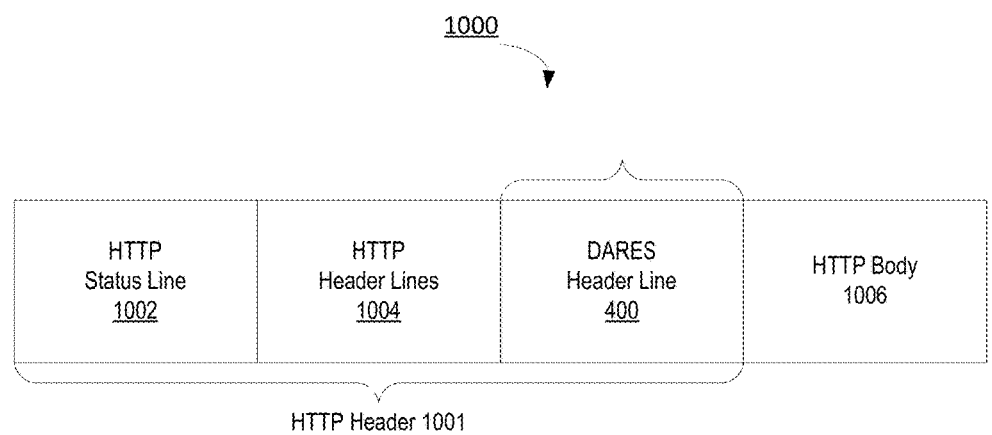
FIG. 10 illustrates a structure of a HTTP response message in which a DARES header is included as a header line in accordance with an example embodiment.

Referring to FIG. 10, an example HTTP response message 1000 includes an HTTP header 1001 that includes an HTTP request line 1002, HTTP header lines 1004 (e.g., content-type), and the DARES header 400, which can be referred to as an DAREQ header line 400. For example, at least a portion, for instance all, of the DAREQ header line 400 can be included as a new HTTP header line. The DARES header line 300 may further include HTTP common fields as an HTTP header line. The HTTP response message 900 may further include a payload 1006. As described above, the DARES header 400 may contain various fields/parameters such as, for example, the critical nodes 402, the number of aggregated data 404, the list of aggregators 406, and the length of items 408.

It is recognized herein that existing HTTP clients/server may be deployed that do not support the DAREQ and DARES header lines 300 and 400 that are described herein. In an example scenario in which the headers are not supported by existing HTTP clients/servers, the HTTP clients/servers may ignore and discard the DAREQ and DARES header lines, for example, if they receive them within an HTTP message. Stated another way, new HTTP features described herein may co-exist with existing HTTP clients/servers in an IoT area network, for example the area network 102.

In another example embodiment, data aggregation described herein is performed in accordance with the MQTT-S protocol. For example, each MQTT-S message may comprise two parts: 1) Message Header; and 2) Message Variable Part. An example MQTT-S message header has two fields: Length and Message (Msg) Type, and an example MQTT-S message variable part has different fields for different messages. The MQTT-S defines a set of messages for various purposes as listed in Table 1 below.

TABLE 1

| MsgType Field Value | MsgType | MsgType Field Value | MsgType |
| --- | --- | --- | --- |
| 0x00 | ADVERTISE | 0x01 | SEARCHGW |
| 0x02 | GWINFO | 0x03 | reserved |
| 0x04 | CONNECT | 0x05 | CONNACK |
| 0x06 | WILLTOPICREQ | 0x07 | WILLTOPIC |
| 0x08 | WILLMSGREQ | 0x09 | WILLMSG |
| 0x0A | REGISTER | 0x0B | REGACK |
| 0x0C | PUBLISH | 0x0D | PUBACK |
| 0x0E | PUBCOMP | 0x0F | PUBREC |
| 0x10 | PUBREL | 0x11 | reserved |
| 0x12 | SUBSCRIBE | 0x13 | SUBACK |
| 0x14 | UNSUBSCRIBE | 0x15 | UNSUBACK |
| 0x16 | PINGREQ | 0x17 | PINGRESP |
| 0x18 | DISCONNECT | 0x19 | reserved |
| 0x1A | WILLTOPICUPD | 0x1B | WILLTOPICRESP |
| 0x1C | WILLMSGUPD | 0x1D | WILLMSGRESP |
| 0x1E-0xFD | reserved | 0xFE | Encapsulated message |
| 0xFF | reserved | | |

The application-protocol-layer data aggregations described above can be applied to the MQTT-S protocol. In an example embodiment, two MQTT-S messages are used for data aggregation: 1) a first message that includes the above-described data aggregation request (DAREQ) header; and 2) a second message that includes the above-described data aggregation response (DARES) header. As an example, MsgType=0x1E can be allocated to the DAREQ header 300 and MsgType=0x1F can be allocated to the DARES header 400, for example, because 0x1E-0xFD are not currently used in the MQTT-S protocol as shown in Table 1.

Figure 11:
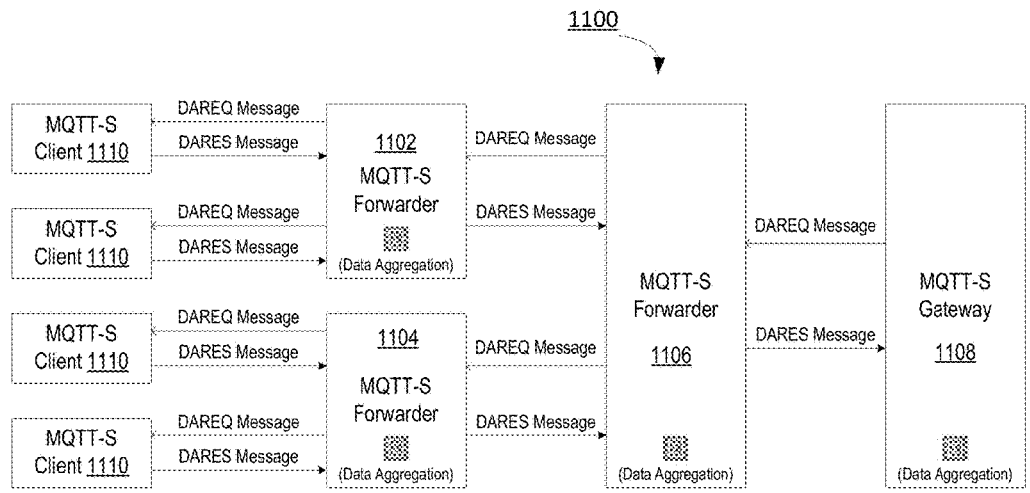
FIG. 11 shows an example message queue telemetry transport (MQTT) sensors networks (MQTT-S) architecture in which embodiments of data aggregation may be implemented.

FIG. 11 shows an example MQTT-S architecture 1100 for supporting data aggregation in accordance with an example embodiment. Referring to FIG. 11, interfaces and interactions are shown between two MQTT-S forwarders 1102 and 1104. The first message that includes the DAREQ header 300 and the second message that includes the DARES header 400 may be exchanged between an MQTT-S gateway 1106 and an MQTT-S forwarder 1108, between the MQTT-S forwarders 1102 and 1104 and the MQTT-S forwarder 1108, and between and forwarders 1102 and 1104 and one more MQTT-S clients 110. Still referring to FIG. 11, the MQTT-S forwarders 1102, 1104, and 1106, and the MQTT-S gateway 1108 may perform data aggregation operations as described above.

Figure 12:
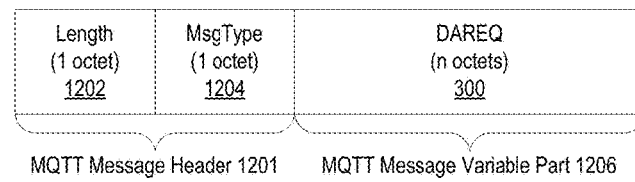
FIG. 12 shows an example structure of a MQTT-S request message in which a DAREQ header is included in accordance with an example embodiment.

FIG. 12 shows an example structure of an example MQTT-S request message 1200 in which the described DAREQ 300 can be included in accordance with an example embodiment. The example MQTT-S request message 1200 includes an MQTT-S message header 1201 that includes a length 1202 and message type 1204. The MQTT-S message 1200 may further include at least a portion, for instance all, of the DAREQ header 300 in a MQTT variable message part 1206. As described above, the DAREQ header 300 may contain various fields/parameters such as, for example, the aggregation group ID 302, the aggregation target 304, the aggregation rule 306, the aggregation condition 308, the aggregation result requirement 310, and the aggregation expiration time 312.

Figure 13:
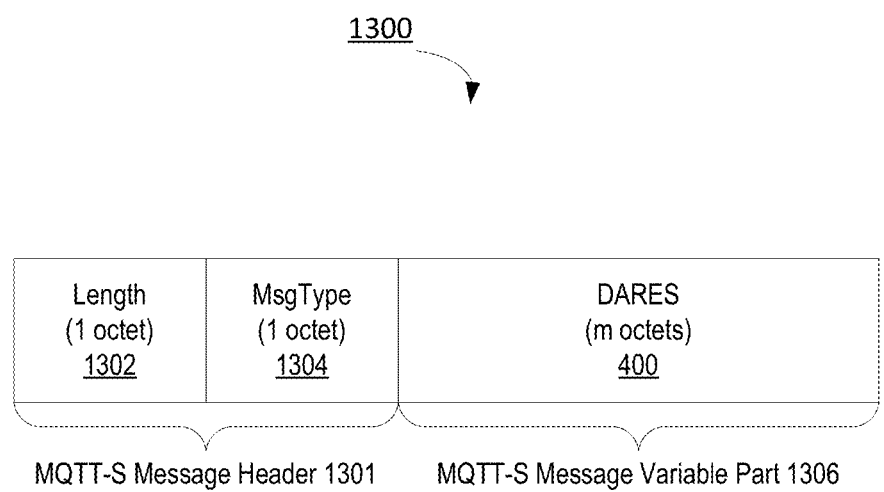
FIG. 13 shows an example structure of a MQTT-S response message in which a DARES header is included in accordance with an example embodiment.

FIG. 13 shows an example structure of an example MQTT-S response message 1300 in which the described DARES 400 can be included in accordance with an example embodiment. The example MQTT-S response message 1300 includes an MQTT-S message header 1301 that includes a length 1302 and message type 1304. The MQTT-S message 1300 may further include at least a portion, for instance all, of the DARES header 400 in a MQTT variable message part 1306. As described above, the DARES header 400 may contain various fields/parameters such as, the critical nodes 402, the number of aggregated data 404, the list of aggregators 406, and the length of items 408.

Figure 14A:
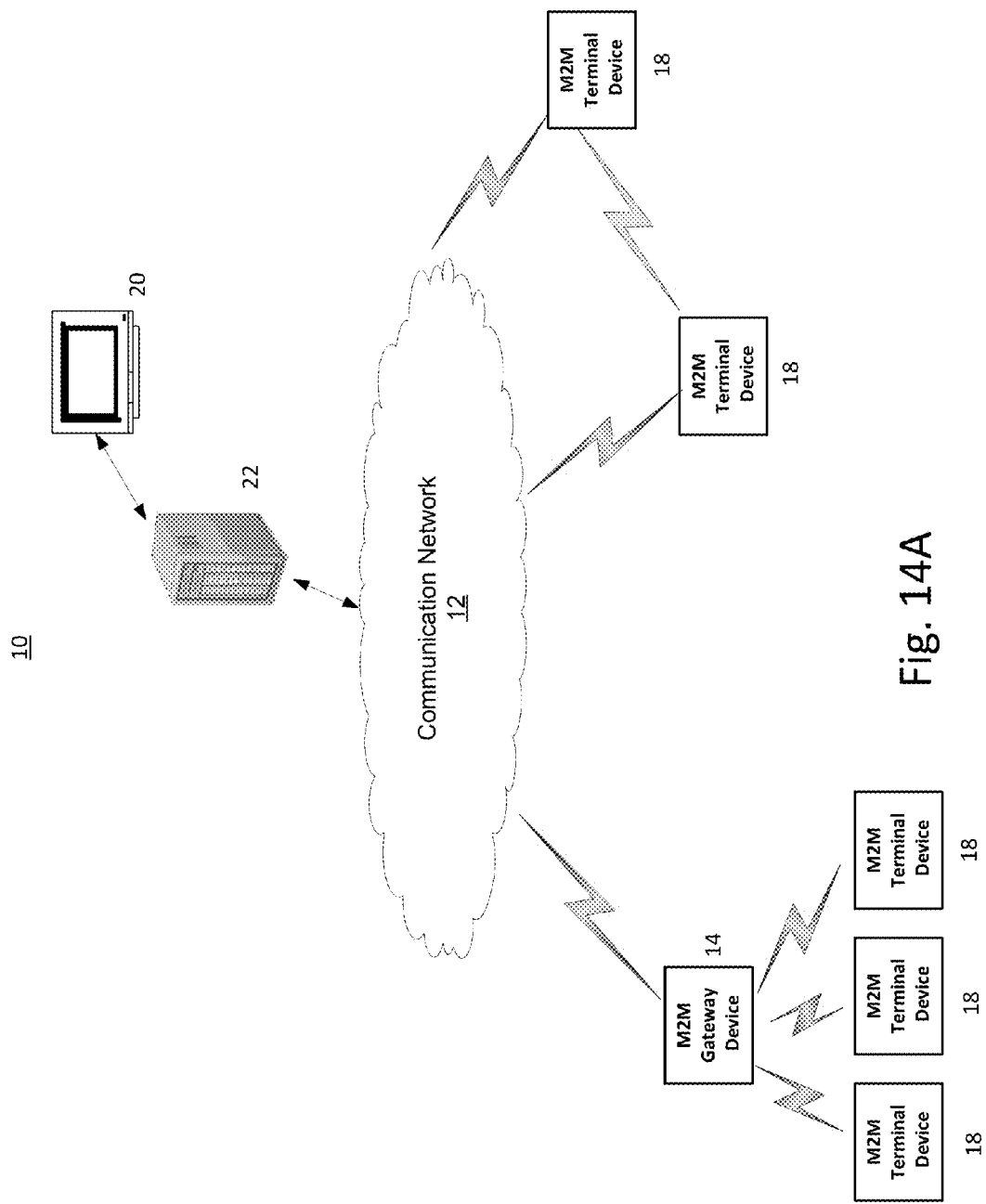
FIG. 14A is a system diagram of an example machine-to-machine (M2M) or Internet of Things (IoT) communication system in which one or more disclosed embodiments may be implemented.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. The gateway devices 14 or the devices 18 may be configured as intermediary nodes in a system that performs data aggregation in accordance with the embodiments described above. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoW-PAN, Bluetooth), direct radio link, and wireline for example. The devices 18 and the gateways 14 may communicate via various networks to exchange data aggregation request and data aggregation response messages, as described above.

Figure 14B:
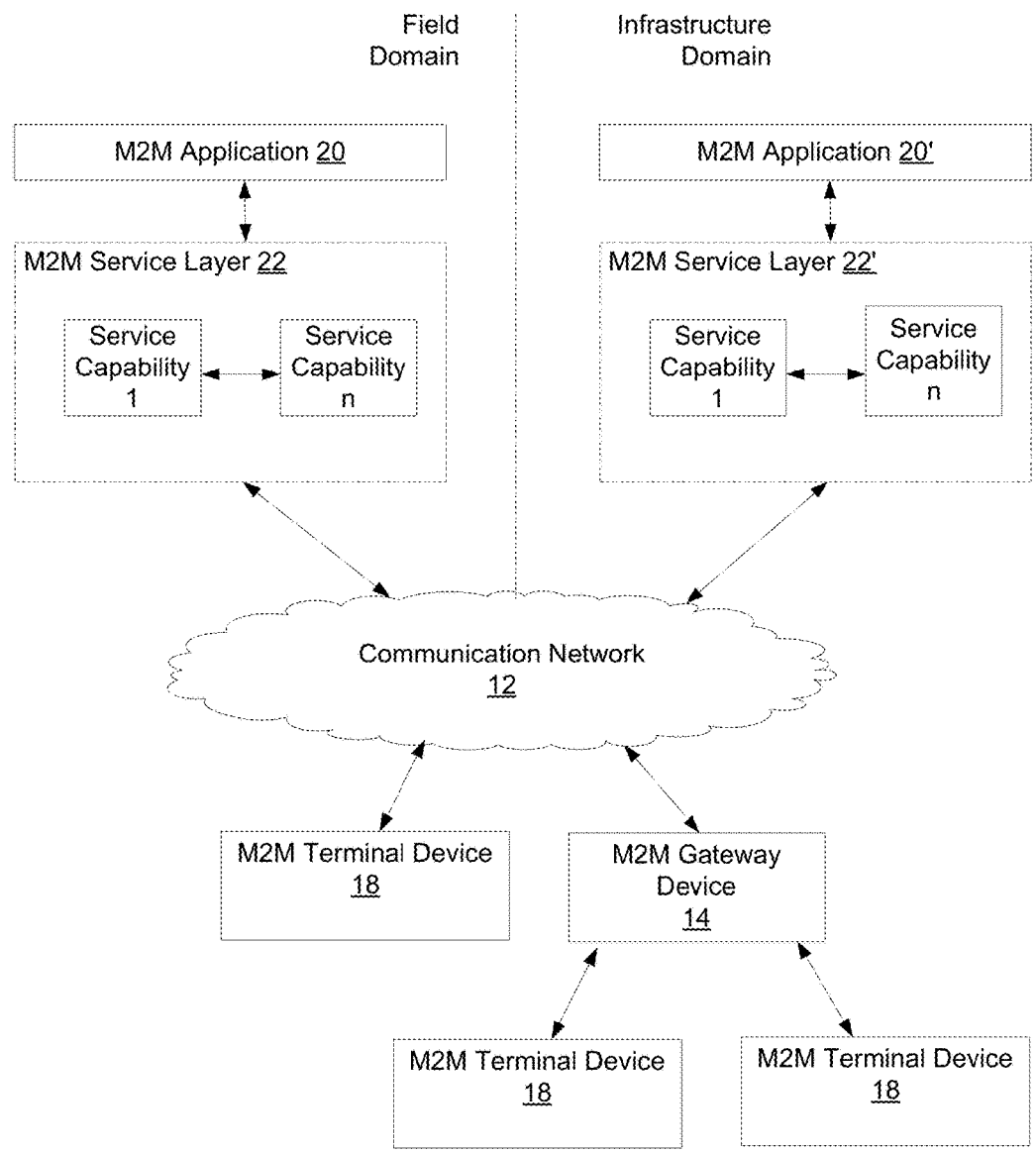
FIG. 14B is a system diagram of an example architecture that may be used within the M2M/IoT communications system illustrated in FIG. 14A.

Referring also to FIG. 14B, the illustrated M2M service layer 22 in the field domain provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18, and communication networks 12 as desired. The M2M service layer 22 may be implemented by one or more servers, computers, or the like. The M2M service 22 layer provides service capabilities that apply to the M2M terminal devices 18, the M2M gateway devices 14, and the M2M applications 20. The functions of the M2M service layer 22 may be implemented in a variety of ways, for example as a web server, in the cellular core network, in the cloud, etc.

Similar to the illustrated M2M service layer 22, an M2M service layer 22' resides in the infrastructure domain. The M2M service layer 22' provides services for an M2M application 20' and an underlying communication network 12' in the infrastructure domain. The M2M service layer 22' also provides services for the M2M gateway devices 14 and M2M terminal devices 18 in the field domain. It will be understood that the M2M service layer 22' may communicate with any number of M2M applications, M2M gateway devices, and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring still to FIG. 1B, the M2M service layers 22 and 22' can provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities can free the applications of the burden of implementing these functionalities, thus simplifying application development and reducing cost and time to market. The service layers 22 and 22' also may enable M2M applications 20 and 20' to communicate through various networks 12 and 12' in connection with the services that the service layers 22 and 22' provide.

As used herein, a service layer may refer to a software middleware layer that supports value-added service capabilities through a set of Application Programming Interfaces (APIs) and underlying networking interfaces. Both ETSI M2M and oneM2M use a service layer that may contain the functionality described herein. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). Further, functionality described herein can implemented as part of an M2M network that uses a Service Oriented Architecture (SOA) and/or a resource-oriented architecture (ROA) to access.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Figure 14C:
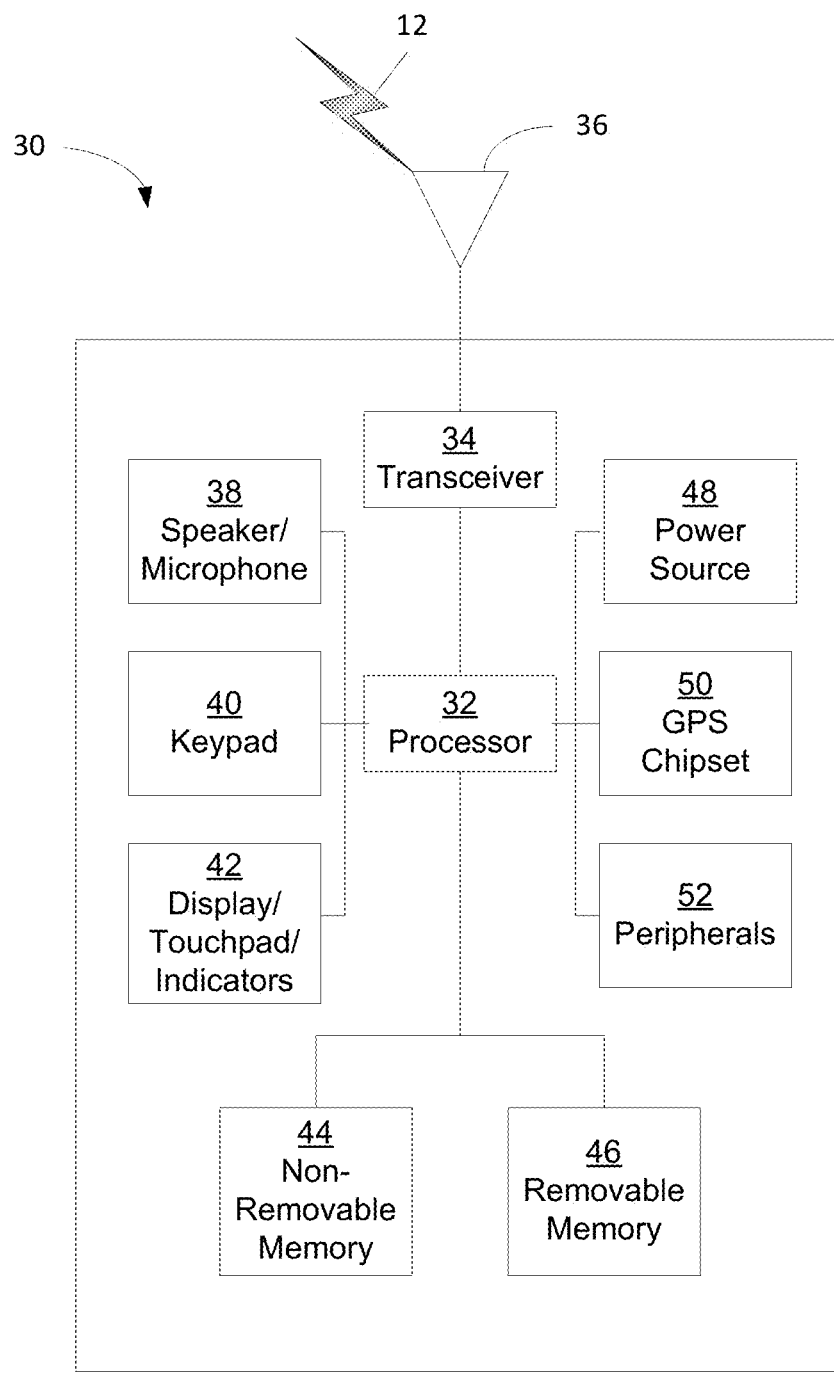
FIG. 14C is a system diagram of an example M2M/IoT terminal or gateway device that may be used within the communications system illustrated in FIG. 14A.

FIG. 14C is a system diagram of an example M2M device 30, such as an M2M terminal device 18 or an M2M gateway device 14 for example. The M2M device 30 may be configured as an intermediary node for performing data aggregation in accordance with the embodiments described above. As shown in FIG. 14C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The display/touchpad/indicators 42 may be generally referred to as a user interface in accordance with an example embodiment. The user interface, which also may be referred to as a data aggregation interface, may allow users to monitor, manage, and/or configure data aggregation on a device, such as a gateway or intermediary node for example. For example, the user interface may enable a user to configure data aggregation rules for the device 30 or another device that is connected to the device 30. Similarly, the user interface may allow the user to configure aggregation conditions. The user interface may be configured to display the above-described list of aggregators. Thus, unique identifiers (e.g., IP address, MAC address, URI) may be displayed by the display/touchpad/indicators 42. The user interface may further display an identifier of a critical node in which the generated data is associated with the final aggregated data. The user interface can also be used by the user to query a system of devices, as described above.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 14C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store and access data aggregation request headers, as described above, from the non-removable memory 44 and/or the removable memory 46 to determine whether there is a particular data aggregation request header that includes a particular aggregation group identity. The non-removable memory 44 may include random-access memory (RAM), read-only memory (ROM), a hard disk, or any other type of memory storage device. The removable memory 46 may include a subscriber identity module (SIM) card, a memory stick, a secure digital (SD)

memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14D:
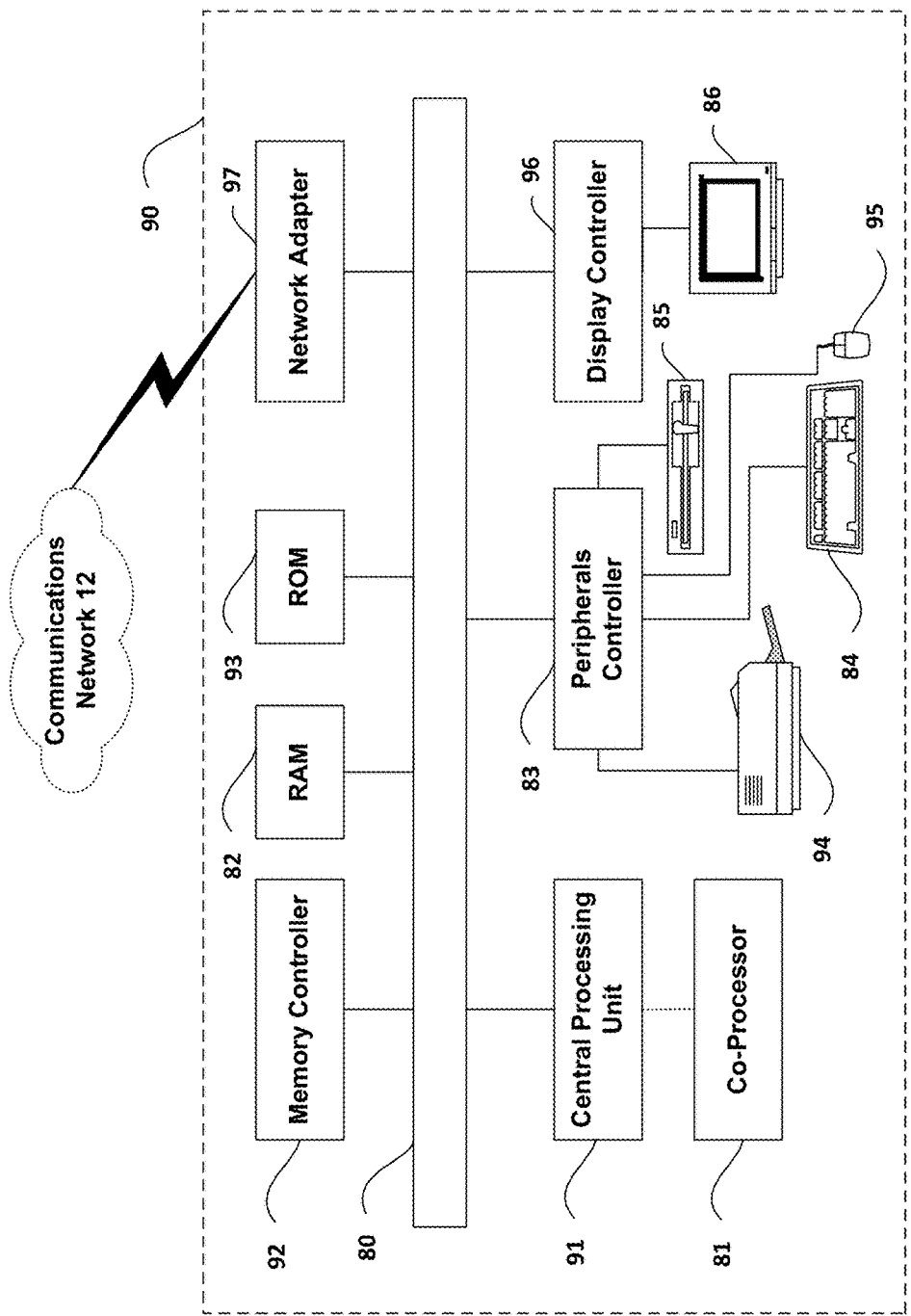
FIG. 14D is a block diagram of an example computing system in which aspects of the communication system of FIG. 14A may be embodied.

FIG. 14D is a block diagram of an exemplary computing system 90 on which, for example, the M2M service platform 22 of FIGS. 14A and 14B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 14A and 14B.

It is understood that any or all of the systems, methods and processes described herein may be embodied in the form of computer executable instructions (i.e., program code) stored on a computer-readable storage medium with instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a system comprising a plurality of devices that include an intermediary node comprising a sensor that communicates with at least some of the plurality of devices via a network, a method comprising, at the intermediary node:
    sending a data aggregation request message to retrieve data from a plurality of different applications, the data aggregation request message comprising an aggregation rule;
    in response to the data aggregation request message, receiving a data aggregation response message that comprises an aggregation group identity and data representative of a set of the plurality of devices, the received data in compliance with the aggregation rule, wherein the set is located downstream in the system from the intermediary node, and the data aggregation request message is an application-protocol layer message;
    based on the aggregation rule, calculating one of a maximum, minimum, or average value associated with one of the devices in the set of the plurality of devices, the data representative of the set of the plurality of devices including the one of the maximum, minimum, or average value;
    generating sensory data;
    aggregating the sensory data with the data representative of the set of the plurality of devices to create an aggregation result;
    creating a new data aggregation response message that includes the aggregation result; and
    sending the new data aggregation response message to at least one device of the plurality of devices, the at least one device located upstream in the system from the intermediary node.

2. The method as recited in claim 1, wherein the data aggregation request message further comprises, and the received data representative of the set of the plurality of devices is based on, the aggregation group identity.

3. The method as recited in claim 1, the method further comprising:
    determining whether there is a data aggregation request header that includes the aggregation group identity; and
    if there is no data aggregation request header that includes the aggregation group identity, forwarding the data aggregation request message to at least one device of the plurality of devices, the at least one device located upstream in the system from the intermediary node.

4. The method as recited in claim 3, wherein the data aggregation response message indicates at least one of one or more critical nodes, a number of aggregated data, a list of aggregators, or a length of data items.

5. The method as recited in claim 1, the method further comprising:
    based on the aggregation result, forwarding the data aggregation request message to at least one device of the plurality of devices, the at least one device located upstream in the system from the intermediary node, whereby the data representative of the set of the plurality of devices is unchanged by the aggregation result.

6. The method as recited in claim 1, the method further comprising:
    based on the aggregation rule and in response to the sensory data, replacing the one of the maximum, minimum, or average value with a new maximum, minimum, or average value; and
    sending a new maximum, minimum, or average value to at least one device located upstream in the system from the intermediary node.

7. A network node in a network of connected nodes, the network node comprising:
    a sensor;
    a first processor adapted to execute computer-readable instructions; and
    a first memory communicatively coupled to said first processor, said first memory having stored therein computer-readable instructions that, when executed by the first processor, cause the processor to perform operations comprising:
        sending a data aggregation request message to retrieve data from a plurality of different applications, the data aggregation request message comprising an aggregation rule;
        in response to the data aggregation request message, receiving a data aggregation response message that comprises an aggregation group identity and data representative of a set of the connected nodes, the received data in compliance with the aggregation rule, wherein the set is located downstream in the system from the network node, and the data aggregation request message is an application-protocol layer message;
        based on the aggregation rule, calculating one of a maximum, minimum, or average value associated with one of the nodes in the set of the connected nodes, the data representative of the set of the connected nodes including the one of the maximum, minimum, or average value;
        generating sensory data;
        aggregating the sensory data with the data representative of the set of the connected nodes to create an aggregation result;
        creating a new data aggregation response message that includes the aggregation result; and
        sending the new data aggregation response message to at least one node in the network of connected nodes, the at least one node located upstream in the system from the intermediary node.

8. The network node as recited in claim 7, wherein the data aggregation request message further comprises the aggregation group identity, and the data representative of the set of the connected nodes is based on the aggregation group identity.

9. The network node as recited in claim 7, the operations further comprising:
    determining whether there is a data aggregation request header that includes the aggregation group identity; and
    if there is no data aggregation request header that includes the aggregation group identity, forwarding the data aggregation request message to at least one node in the network of connected nodes, the at least one node located upstream in the network from the network node.

10. The network node as recited in claim 9, wherein the data aggregation response message indicates at least one of one or more critical nodes, a number of aggregated data, a list of aggregators, or a length of data items.

11. The network node as recited in claim 7, the operations further comprising:
based on the aggregation result, forwarding the data aggregation request message to at least one in the network of connected nodes, the at least one node located upstream in the network from the network node, whereby the data representative of the set of the connected nodes is unchanged by the aggregation result.

12. The network node as recited claim 7, the method further comprising:
based on the aggregation rule and in response to the sensory data, replacing the one of the maximum, minimum, or average value with a new maximum, minimum, or average value; and
sending a new maximum, minimum, or average value to at least one node located upstream in the network from the network node.

\* \* \* \* \*